US011873652B2

(12) United States Patent
Bellissimo et al.

(10) Patent No.: US 11,873,652 B2
(45) **Date of Patent: *Jan. 16, 2024**

(54) AUTOMATED SYSTEMS AND METHODS FOR FLOOR AND CEILING UNITS IN THE CONSTRUCTION OF MODULAR BUILDING UNITS

(71) Applicant: Buildz, LLC, Forest City, NC (US)

(72) Inventors: Mark Joseph Bellissimo, Wellington, FL (US); Jason Daryl Hunsinger, Forest City, NC (US); Stanley Clark Beard, Jr., Hendersonville, NC (US); Harrison Grant Meadows, Forest City, NC (US)

(73) Assignee: Buildz, LLC, Forest City, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,348

(22) Filed: Dec. 30, 2021

(65) Prior Publication Data

US 2022/0268040 A1 Aug. 25, 2022

Related U.S. Application Data

(63) Continuation of application No. 17/115,477, filed on Dec. 8, 2020, now Pat. No. 11,236,519, which is a (Continued)

(51) Int. Cl.
*E04G 21/16* (2006.01)
*B27M 3/04* (2006.01)
(Continued)

(52) U.S. Cl.
CPC ........... *E04G 21/16* (2013.01); *B27M 3/0073* (2013.01); *B27M 3/04* (2013.01); *E04B 1/7654* (2013.01); *E04B 2/707* (2013.01); *E04B 5/12* (2013.01)

(58) Field of Classification Search
CPC ....... E04G 21/16; B27M 3/0073; B27M 3/04; E04B 1/7654; E04B 2/707; E04B 5/12
See application file for complete search history.

(56) References Cited

U.S. PATENT DOCUMENTS 2,281,402 A 4/1942 Wilson
2,574,163 A 11/1951 Bamford
(Continued)

FOREIGN PATENT DOCUMENTS

EP 3 802 031 A1 4/2021
EP 3 802 032 A1 4/2021
(Continued)

OTHER PUBLICATIONS

Chilean Office Action for Application No. 2020003187 dated Oct. 17, 2022.
(Continued)

*Primary Examiner* — Gisele D Ford
(74) *Attorney, Agent, or Firm* — Venable LLP; Michele V. Frank

(57) ABSTRACT

A system and method for assembling framing assemblies for use as ceiling or floor structures of modular building units using automation are disclosed. The framing assemblies include trusses that are attached at the lateral edges thereof by a joist including at least one layer of dimensional lumber to form a substantially rigid framework. Cover panels are positioned over and attached to an inner surface of the framing assembly.

20 Claims, 22 Drawing Sheets

Related U.S. Application Data continuation of application No. PCT/US2019/036108, filed on Jun. 7, 2019.

(60) Provisional application No. 62/682,568, filed on Jun. 8, 2018.

(51) Int. Cl.

| | |
|---|---|
| ***E04B 5/12*** | (2006.01) |
| ***B27M 3/00*** | (2006.01) |
| ***E04B 1/76*** | (2006.01) |
| ***E04B 2/70*** | (2006.01) |

(56) References Cited

U.S. PATENT DOCUMENTS

| | | | |
|---|---|---|---|
| 2,754,862 | A | 7/1956 | Kemp, Jr. |
| 3,581,367 | A | 6/1971 | Zeinetz |
| 3,591,067 | A | 7/1971 | Vial et al. |
| 3,601,882 | A | 8/1971 | McRae |
| 3,685,129 | A | 8/1972 | Jureit et al. |
| 3,688,965 | A | 9/1972 | Kellner et al. |
| 3,699,622 | A | 10/1972 | Frydenberg |
| 3,706,408 | A | 12/1972 | Burch |
| 3,711,007 | A | 1/1973 | Fry |
| 3,811,167 | A | 5/1974 | Schneider |
| 3,851,384 | A | 12/1974 | Kellner et al. |
| 3,897,620 | A | 8/1975 | Wright |
| 3,986,247 | A | 10/1976 | Kellner et al. |
| 4,133,097 | A | 1/1979 | Slade |
| 4,829,651 | A | 5/1989 | Shirai |
| 4,867,819 | A | 8/1989 | Richardelli et al. |
| 5,031,886 | A | 7/1991 | Sosebee |
| 5,615,122 | A | 3/1997 | Lacrosse |
| 5,641,368 | A | 6/1997 | Romes et al. |
| 5,646,860 | A | 7/1997 | Greiner et al. |
| 5,850,686 | A | 12/1998 | Mertes |
| 6,418,601 | B1 | 7/2002 | Olden et al. |
| 7,172,064 | B2 | 2/2007 | Alversson |
| 7,979,981 | B2 | 7/2011 | Bertrand |
| 11,236,519 | B2 | 2/2022 | Bellissimo et al. |
| 11,472,059 | B2 | 10/2022 | Kent |
| 2005/0055973 | A1 | 3/2005 | Hagen et al. |
| 2005/0102971 | A1 | 5/2005 | O'Leary et al. |
| 2007/0144102 | A1 | 6/2007 | Baij |
| 2008/0168741 | A1 | 7/2008 | Gilgan et al. |
| 2008/0289288 | A1 | 11/2008 | Bertrand |
| 2009/0300999 | A1 | 12/2009 | Ferriere |
| 2010/0006392 | A1 | 1/2010 | Weinmann |
| 2010/0281784 | A1 | 11/2010 | Leo |
| 2013/0330435 | A1 | 12/2013 | Lim |
| 2021/0164246 | A1 | 6/2021 | Bellissimo et al. |
| 2021/0187783 | A1 | 6/2021 | Bellissimo et al. |

FOREIGN PATENT DOCUMENTS

| | | | |
|---|---|---|---|
| GB | 2539661 | A | 12/2016 |
| WO | WO 2019/237030 | A1 | 12/2019 |
| WO | WO 2019/237034 | A1 | 12/2019 |
| WO | 2022183037 | A1 | 9/2022 |

OTHER PUBLICATIONS

Colombian Office Action for Application No. 20200015543 dated Oct. 31, 2022.
Canadian Office Action for Application No. 3102605 dated Feb. 1, 2023.
Canadian Office Action for Application No. 3102568 dated Feb. 2, 2023.
European Office Action for Application No. 19733354 dated Feb. 2, 2023.
International Search Report and Written Opinion for Application No. PCT/US2019/036097 dated Aug. 27, 2019.
International Search Report and Written Opinion for Application No. PCT/US2019/036108 dated Aug. 27, 2019.
Anonymous: "Info-408: Critical Seal (Spray Foam at Rim Joist) Building Science Corporation", Sep. 17, 2009 (Sep. 17, 2009).
Panama Search Report for Application No. 93306-01 dated Aug. 6, 2021.
Panama Search Report for Application No. 93307-01 dated Aug. 9, 2021.
Notice of Allowance for U.S. Appl. No. 17/115,477 dated Sep. 28, 2021.
Corrected Notice of Allowance for U.S. Appl. No. 17/115,477 dated Oct. 12, 2021.
European Office Action for Application No. 197333537 dated Jan. 21, 2022.
Chilean Office Action for Application No. 202003187 dated Feb. 17, 2022.
Chilean Office Action for Application No. 2020003188 dated Apr. 14, 2022.
Indian Examination Report for Application No. 202147000837 dated Jul. 11, 2022.
Indian Examination Report for Application No. 202147000836 dated Jul. 14, 2022.
European Search Report from EP Application No. 23164624.1 dated Jun. 29, 2023.
Notice of Allowance dated May 9, 2023 from U.S. Appl. No. 17/115,491.
Notice of Allowance dated Aug. 9, 2023 from U.S. Appl. No. 17/115,491.
Communication under Rule 71(3) EPC from EP Application No. 19733354.5 dated Aug. 24, 2023.
Decision to grant a European patent pursuant to Article 91(1) EPC from EP Application No. 19733354.5 dated Oct. 26, 2023.
Notice of Allowance from Canadian Application No. 3, 102,568 dated Sep. 11, 2023.

AUTOMATED SYSTEMS AND METHODS FOR FLOOR AND CEILING UNITS IN THE CONSTRUCTION OF MODULAR BUILDING UNITS

CROSS-REFERENCE TO RELATED APPLICATIONS

This application is a continuation of and claims priority to U.S. patent application Ser. No. 17/115,477, filed on Dec. 8, 2020, which claims benefit of PCT Application Serial No. PCT/US2019/036108, which was filed on Jun. 7, 2019, the disclosures of which are incorporated by reference herein in their entireties.

TECHNICAL FIELD

The subject matter disclosed herein relates generally to the construction of modular construction units. In particular, the presently disclosed subject matter relates to a system for constructing a wall section for use in a modular construction unit, as well as associated methods of manufacture thereof.

BACKGROUND

The production of modular, or prefabricated, buildings is a growing industry. In this type of manufacturing, sections of a building or structure are partially assembled at a remote location, and the sections are then delivered to the final building site, where final construction of the structure is ultimately completed by assembling the various sections together. Such modular structures can be used for a variety of purposes, including, for example, as temporary or permanent buildings, such as residential homes, commercial offices, educational or service facilities, etc.

Modular structures can have advantages over site-built structures in that they can often be built more rapidly and less expensively than structures built using such traditional construction techniques. In many cases, quality measurements such as squareness and structural integrity and strength can also be improved in modular constructed structures over traditional construction techniques, due to enhanced and/or automated processes available at the remote assembly location where the modular construction units are built and/or assembled before being transported to the final building site for final assembly. In particular, remote assembly can be advantageous in that it is more repeatable, offering greater accuracy and precision than is often possible using conventional construction techniques. This reduces the cost of the structure through by allowing for reduced safety factors to account for, due to the increased use of automation, decreased instances of human error, less material waste, and efficient process flow methods.

Nonetheless, opportunity still exists to improve modular building assembly systems. Existing modular building methods suffer from disadvantages related to process and/or tooling inflexibility. For example, a system might be limited to particular structural components or to particular material(s) and/or fastener type(s). In some cases, manual intervention by a human operator may be necessary with regularity at many steps of the process. Additionally, some systems are not capable of performing quality control checks. Thus, a need exists for improved systems, devices, and methods for the manufacture of modular construction units.

SUMMARY

This summary lists several embodiments of the presently disclosed subject matter, and in many cases lists variations and permutations of these embodiments. This summary is merely exemplary of the numerous and varied embodiments.

Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In one aspect, a system for assembling a framing assembly for a floor or ceiling in a modular construction unit is provided, the system comprising: a truss storage area comprising a truss storage rack, which has a plurality of levels on which trusses can be stored, and a truss elevator configured to raise and transport trusses onto one of the levels of the truss storage rack and/or retrieve and lower trusses from one of the levels of the truss storage rack; a truss placement system configured to receive trusses, via a truss conveyor system, from the truss storage area, wherein the truss placement system is configured to position trusses on an assembly conveyor, the trusses being spaced apart from each other by a predetermined distance; a joist placement system configured to receive and arrange dimensional lumber adjacent lateral edges of the trusses on opposite sides of the assembly conveyor; a framing system comprising the assembly conveyor and a plurality of first fastening devices configured to move along a length of the assembly conveyor to attach the joists to the trusses via applying a plurality of fasteners in at least one predetermined pattern through the joist and one of the trusses; a sheathing/drywall installation system configured to position a plurality of panel members over an exposed surface of the framing assembly after the trusses and the joists are fastened together at the framing system, the panel members being positioned to cover all or a designated portion of the exposed surface of the framing assembly according to a panel placement pattern associated with the framing assembly being assembled; and a fastening system comprising a plurality of second fastening devices to attach, by applying a plurality of fasteners through at least one of the panel members and one of the trusses or the joists of the framing assembly, the panel members to the framing assembly.

In some embodiments of the system, the dimensional lumber forming the joists comprises laminated veneer lumber and wherein the trusses comprise a rigid framework formed from a plurality of individual elements.

In some embodiments of the system, the joist placement system comprises a plurality of tables arranged on opposite lateral sides of the assembly conveyor, the plurality of tables being configured to transport the dimensional lumber deposited thereon to a position adjacent the assembly conveyor.

In some embodiments, the system comprises, adjacent to the assembly conveyor, a trough formed by a plurality of rollers configured to transport the dimensional lumber received from the tables of the joist placement system against a registration stop configured to substantially align an end of the joist with a last of the trusses placed on the assembly conveyor.

In some embodiments, the system comprises a plurality of brackets that are arranged along and in between the rollers of the trough, the brackets being pivotable between a retracted position, in which the joists within the trough are in contact with the rollers, and a deployed position, in which the joists are pivoted to a substantially vertical position adjacent lateral edges of the trusses.

In some embodiments of the system, the plurality of first fastener devices is configured to move along the length of the assembly conveyor to apply the plurality of fasteners in the at least one predetermined pattern to attach the joists and the trusses together after the joists have been moved into the vertical position by the plurality of brackets.

In some embodiments of the system, the plurality of brackets are substantially L-shaped.

In some embodiments of the system, the joists comprise at least an inner layer of dimensional lumber and an outer layer of dimensional lumber and wherein the plurality of brackets comprise a plurality of first brackets and a plurality of second brackets, the plurality of first brackets being configured to arrange the inner layer of the dimensional lumber against the lateral edges of the trusses and the plurality of second brackets being configured to arrange the outer layer of dimensional lumber against the inner layer of dimensional lumber.

In some embodiments of the system, the plurality of first fastener devices is configured to move along the length of the assembly conveyor to apply the plurality of fasteners in a first predetermined fastener pattern to attach the inner layer and the trusses together after the inner layer has been moved into the vertical position against the lateral edges of the trusses by the plurality of first brackets, the plurality of first fastener devices is configured to move along the length of the assembly conveyor to apply the plurality of fasteners in a second predetermined fastener pattern to attach the outer layer and the inner layer together after the outer layer has been moved into the vertical position against the inner layer by the plurality of second brackets, and the first predetermined fastener pattern is different from, and does not overlap with, the second predetermined fastener pattern along the length of the assembly conveyor.

In some embodiments of the system, the plurality of first brackets and the plurality of second brackets are each connected to one of a plurality of independently controlled actuators that move the plurality of first brackets and the plurality of second brackets between respective retracted and deployed positions.

In some embodiments of the system, the inner layer and the outer layer are each pieced together from a plurality of pieces of dimensional lumber, each of which have a length that is less than a length of the joists.

In some embodiments of the system, joints, which are defined as being where ends of dimensional pieces of lumber in a same layer of dimensional lumber, are positionally staggered and/or offset along the length of the assembly conveyor so that no joints in the inner layer are coincident with any joints in the outer layer.

In some embodiments, the system comprises a routing system having a routing robot configured to form openings in one or more of the panel members.

In some embodiments of the system, the panel members comprise, when the framing assembly is for the floor in the modular construction unit, a plurality of sheathing panels or, when the framing assembly is for the ceiling in the modular construction unit, a plurality of drywall panels.

In some embodiments of the system, the sheathing panels comprise one or move of: lumber, fire-treated lumber, laminated strand lumber (LSL), laminated veneer lumber (LVL), oriented strand board (OSB), plywood, and chipboard. In some embodiments of the system, the assembly conveyor is laterally expandable in a direction orthogonal to a direction in which the trusses are advanced along the assembly conveyor to accommodate framing assemblies of any of a plurality of widths.

In some embodiments, the system comprises an etching system configured to mark keep-outs and/or mounting locations of fixtures on the panel members attached to the framing assembly.

In some embodiments, the system comprises a butterfly flip table configured to rotate the framing assembly such that the panel members attached thereto are rotated by substantially 180° and to transport the framing assembly to an insulation system or a sheathing/membrane installation system, respectively.

In some embodiments of the system, the insulation system is configured to apply insulation within one or more cavities defined between adjacent trusses of the framing assembly.

In some embodiments, the system comprises an adhesive application system, which comprises a plurality of applicator nozzles configured to dispense an adhesive material onto an upper surface of the trusses and/or the joists of the framing assembly.

In some embodiments of the system, the trusses are positioned on the assembly conveyor in a sequential manner, the assembly conveyor being configured to advance by a distance corresponding to a pitch between adjacent trusses in the framing assembly before a further truss is positioned by the truss placement system on the assembly conveyor.

According to a second example aspect, a method of assembling a framing assembly for a floor or ceiling in a modular construction unit is provided, the method comprising: transporting a plurality of trusses from a truss storage area to a truss placement system; positioning, using the truss placement system, the trusses on an assembly conveyor such that the trusses are spaced apart from each other by a predetermined distance; receiving and arranging, via a joist placement system, dimensional lumber adjacent to lateral edges of the trusses on opposite sides of the assembly conveyor; moving, at a framing system, a plurality of first fastening devices along a length of the assembly conveyor and applying a plurality of fasteners in at least one predetermined pattern through the joist and one of the trusses to attach the joists to the trusses; positioning, at a sheathing/drywall installation system, a plurality of panel members over an exposed surface of the framing assembly after the trusses and the joists are fastened together at the framing system, the panel members being positioned to cover all or a designated portion of the exposed surface of the framing assembly according to a panel placement pattern associated with the framing assembly being assembled; and applying, at a fastening system, a plurality of fasteners through at least one of the panel members and one of the trusses or the joists of the framing assembly, using a plurality of second fastening devices, to attach the panel members to the framing assembly.

In some embodiments of the method, the dimensional lumber forming the joists comprises laminated veneer lumber and wherein the trusses comprise a rigid framework formed from a plurality of individual elements.

In some embodiments of the method, the joist placement system comprises a plurality of tables that transport the dimensional lumber deposited thereon to a position adjacent the assembly conveyor, the tables being arranged on opposite lateral sides of the assembly conveyor.

In some embodiments, the method comprises transporting the dimensional lumber received from the tables of the joist placement system along a trough formed by a plurality of rollers, the trough being adjacent to the assembly conveyor, against a registration stop to substantially align an end of the joist with a last of the trusses placed on the assembly conveyor.

In some embodiments, the method comprises arranging a plurality of brackets along and in between the rollers of the trough, the brackets being pivotable between a retracted position, in which the joists within the trough are in contact with the rollers, and a deployed position, in which the joists are pivoted to a substantially vertical position adjacent lateral edges of the trusses. In some embodiments, the method comprises moving the plurality of first fastener devices along the length of the assembly conveyor and applying in the at least one predetermined pattern the plurality of fasteners to attach the joists and the trusses together after the joists have been moved into the vertical position by the plurality of brackets.

In some embodiments of the method, the plurality of brackets are substantially L-shaped.

In some embodiments of the method, the joists comprise at least an inner layer of dimensional lumber and an outer layer of dimensional lumber and wherein the plurality of brackets comprise a plurality of first brackets and a plurality of second brackets, wherein the plurality of first brackets arrange the inner layer of the dimensional lumber against the lateral edges of the trusses and the plurality of second brackets arrange the outer layer of dimensional lumber against the inner layer of dimensional lumber.

In some embodiments, the method comprises: moving the plurality of first fastener devices along the length of the assembly conveyor and applying the plurality of fasteners in a first predetermined fastener pattern to attach the inner layer and the trusses together after the inner layer has been moved into the vertical position against the lateral edges of the trusses by the plurality of first brackets; and moving the plurality of first fastener devices along the length of the assembly conveyor and applying the plurality of fasteners in a second predetermined fastener pattern to attach the outer layer and the inner layer together after the outer layer has been moved into the vertical position against the inner layer by the plurality of second brackets; wherein the first predetermined fastener pattern is different from, and does not overlap with, the second predetermined fastener pattern along the length of the assembly conveyor.

In some embodiments of the method, the plurality of first brackets and the plurality of second brackets are each connected to one of a plurality of independently controlled actuators that move the plurality of first brackets and the plurality of second brackets between respective retracted and deployed positions. In some embodiments of the method, the inner layer and the outer layer are each pieced together from a plurality of pieces of dimensional lumber, each of which have a length that is less than a length of the joists.

In some embodiments of the method, joints, which are defined as being where ends of dimensional pieces of lumber in a same layer of dimensional lumber, are positionally staggered and/or offset along the length of the assembly conveyor so that no joints in the inner layer are coincident with any joints in the outer layer.

In some embodiments, the method comprises forming, at a routing system having a routing robot, openings in one or more of the panel members.

In some embodiments of the method, the panel members comprise, when the framing assembly is for the floor in the modular construction unit, a plurality of sheathing panels or, when the framing assembly is for the ceiling in the modular construction unit, a plurality of drywall panels.

In some embodiments of the method, the sheathing panels comprise one or move of: lumber, fire-treated lumber, laminated strand lumber (LSL), laminated veneer lumber (LVL), oriented strand board (OSB), plywood, and chipboard.

In some embodiments of the method, the assembly conveyor is laterally expandable in a direction orthogonal to a direction in which the trusses are advanced along the assembly conveyor to accommodate framing assemblies of any of a plurality of widths.

In some embodiments, the method comprises marking, at an etching system, keep-outs and/or mounting locations of fixtures on the panel members attached to the framing assembly.

In some embodiments, the method comprises rotating, using a butterfly flip table, the framing assembly such that the panel members attached thereto are rotated by substantially 180° and to transport the framing assembly to an insulation system or a sheathing/membrane installation system, respectively.

In some embodiments, the method comprises applying, at the insulation system, insulation within one or more cavities defined between adjacent trusses of the framing assembly.

In some embodiments, the method comprises dispensing, at an adhesive application system having a plurality of applicator nozzles, an adhesive material onto an upper surface of the trusses and/or the joists of the framing assembly.

In some embodiments of the method, the trusses are positioned on the assembly conveyor in a sequential manner and the assembly conveyor is advanced, after a truss is positioned thereon, by a distance corresponding to a pitch between adjacent trusses in the framing assembly before a further truss is positioned by the truss placement system on the assembly conveyor.

In another embodiment, a method of arranging a plurality of trusses on an assembly conveyor to be spaced apart by a predetermined distance for assembly as a portion of a framing assembly for a floor or ceiling in a modular construction unit is provided, the method comprising: transporting a plurality of trusses to a truss placement system; advancing the trusses along transport tracks of the truss placement system until a lead truss is positioned in a transfer position; detecting the lead truss in the transfer position using one or more sensors; transporting the lead truss to a designated deposit position on the assembly conveyor and depositing the lead truss on the assembly conveyor at the designated deposit position; advancing the lead truss along the assembly conveyor by the predetermined distance corresponding to a pitch between adjacent trusses in the framing assembly; repeatedly advancing the trusses along the transport tracks of the truss placement system such that a further truss is positioned in the transfer position; detecting each subsequent truss in the transfer position using the one or more sensors; repeatedly transporting each subsequent truss to a designated deposit position on the assembly conveyor and depositing each subsequent truss on the assembly conveyor at the designated deposit position; and repeatedly advancing, after each subsequent truss is deposited on the assembly conveyor in the designated deposit position, the lead truss and each subsequent truss positioned on the assembly conveyor along the assembly conveyor by the predetermined distance.

In another embodiment, a method of assembling a framing assembly for a floor or ceiling in a modular construction unit is provided, the method comprising: arranging a plurality of trusses on an assembly conveyor, comprising: transporting a plurality of trusses to a truss placement system, advancing the trusses along transport tracks of the truss placement system until a lead truss is positioned in a transfer position; detecting the lead truss in the transfer position using one or more sensors, transporting the lead truss to a designated deposit position on the assembly conveyor and depositing the lead truss on the assembly conveyor at the designated deposit position, advancing the lead truss along the assembly conveyor by a predetermined distance corresponding to a pitch between adjacent trusses in the framing assembly, repeatedly advancing the trusses along the transport tracks of the truss placement system such that a further truss is positioned in the transfer position, detecting each subsequent truss in the transfer position using the one or more sensors, repeatedly transporting each subsequent truss to a designated deposit position on the assembly conveyor and depositing each subsequent truss on the assembly conveyor at the designated deposit position, repeatedly advancing, after each subsequent truss is deposited on the assembly conveyor in the designated deposit position, the lead truss and each subsequent truss positioned on the assembly conveyor along the assembly conveyor by the predetermined distance; and assembling joists on opposing lateral sides of the plurality of trusses arranged on the assembly conveyor, comprising: transporting a plurality of pieces of dimensional lumber onto tables that are arranged, respectively, on opposite sides of the assembly conveyor, transferring a first piece of dimensional lumber onto rollers adjacent to, and on opposite sides of, the assembly conveyor, the rollers each defining a trough on the opposite sides of the assembly conveyor, transporting each first piece of dimensional lumber along the trough in the direction of a last of the subsequent trusses deposited in the designated deposit position, aligning both first pieces of dimensional lumber within the respective troughs such that an end of both first pieces of dimensional lumber adjacent the last subsequent truss is substantially coplanar to a surface of the truss defining an external surface of the framing assembly, repeatedly transferring subsequent first pieces of dimensional lumber onto the rollers of the trough, repeatedly transporting each subsequent first piece of dimensional lumber along the trough in a same direction in which the first piece of dimensional lumber was transported, abutting adjacent pieces of lumber within a same trough so that ends of adjacent pieces of lumber touch each other, actuating a first pivotable arm to pivot each of the first pieces of dimensional lumber within the trough to be adjacent to, pressed against, and/or in contact with, the lateral sides of each of the trusses on the assembly conveyor to define an inner layer of joists on opposite sides of the trusses, applying a plurality of fasteners in a first predetermined pattern through the inner layer of joists and into one or more of the trusses, transferring a second piece of dimensional lumber onto the rollers of the trough, transporting each second piece of dimensional lumber along the trough in the direction of the last of the subsequent trusses deposited in the designated deposit position, aligning both second pieces of dimensional lumber within the respective troughs such that an end of both second pieces of dimensional lumber adjacent the last subsequent truss is substantially coplanar to a surface of the truss defining an external surface of the framing assembly, repeatedly transferring subsequent second pieces of dimensional lumber onto the rollers of the trough, repeatedly transporting each subsequent second piece of dimensional lumber along the trough in a same direction in which the second piece of dimensional lumber was transported, abutting adjacent pieces of lumber within a same trough so that ends of adjacent pieces of lumber touch each other, actuating a second pivotable arm to pivot each of the second pieces of dimensional lumber within the trough to be adjacent to, pressed against, and/or in contact with, the respective inner layer of joists to form an outer layer of joists on opposite sides of the framing assembly, and applying a plurality of fasteners in a second predetermined pattern through the outer layer of joists and into the adjacent inner layer of joists to form the framing assembly.

In some embodiments, the fasteners applied in the first and second predetermined patterns are offset from, and/or interwoven with, each other so that fasteners applied in the second predetermined pattern will not contact fasteners applied in the first predetermined pattern when inserted through the outer layer of joists and into the respective inner layer of joists. In some embodiments, each of the first pieces of dimensional lumber, the second pieces of dimensional lumber, the subsequent first pieces of dimensional lumber, and the subsequent second pieces of dimensional lumber can have a same or a different length and are assembled together along the length of the trough to form a joist having a same length as the length of the framing assembly. In some embodiments, the actuator is a linear actuator comprising a stepper and/or servo motor. In some embodiments, the inner layer of joists is combined with the outer layer of joists and the joists are formed from a single continuous and uninterrupted piece of dimensional lumber. In some embodiments of the method, the dimensional lumber comprises a laminated veneer lumber (LVL).

In another embodiment, a method of attaching a plurality of panel members, comprising at least sheathing panels and/or drywall panels, over a surface of a framing assembly, which comprises a plurality of trusses arranged between opposing joists, is provided, the method comprising: retrieving a panel member from a supply area, positionally registering the panel member (e.g., on a registration table comprising one or more positional sensors); transporting the panel member to a designated position on the framing assembly according to a predetermined panel pattern; and depositing the panel member in the designated position on the framing assembly. In some embodiments, the method comprises positioning further panel members in further designated positions on the framing assembly according to the predetermined panel pattern. In some embodiments of the method, the panel members cover all, or a portion of (e.g., a majority of), an internal surface of the framing assembly. In some embodiments, the method comprises engaging the framing assembly and driving, at a leading edge thereof, corners of the framing assembly against a registration stop to ensure that the framing assembly is square before the fasteners are applied to the framing assembly. In some embodiments, fasteners are applied to secure the panel members to the framing assembly for transport to a sheathing fastening station. In some embodiments, the method comprises determining whether the framing assembly is a flooring framing assembly or a ceiling framing assembly. In some such embodiments, when the framing assembly is a flooring framing assembly, the panel members are sheathing panel and, when the framing assembly is a ceiling framing assembly, the panel members are drywall panels. In some embodiments, the sheathing panels comprise lumber, fire-treated lumber, laminated strand lumber (LSL), laminated veneer lumber (LVL), oriented strand board (OSB), plywood, and/or chipboard.

The methods and systems disclosed herein can be combined in any combination and/or sub-combination, adding elements from other systems and/or sub-systems or steps from other methods and/or sub-methods, as the case may be, and/or omitting elements from other systems and/or subsystems or steps from other methods and/or sub-methods without limitation. Nothing disclosed herein shall be interpreted as limiting in any way the combinations in which the features, structures, steps, etc. may be organized, described, and/or claimed in this or any related applications.

These and other objects are achieved in whole or in part by the presently disclosed subject matter. Further, objects of the presently disclosed subject matter having been stated above, other objects and advantages of the presently disclosed subject matter will become apparent to those skilled in the art after a study of the following description, drawings and examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, can be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

Like numbers refer to like elements throughout. In the figures, the thickness of certain lines, layers, components, elements or features can be exaggerated for clarity. Where used, broken lines illustrate optional features or operations unless specified otherwise.

For a more complete understanding of the presently disclosed subject matter, reference is now made to the drawings submitted herewith.

Figure 1:
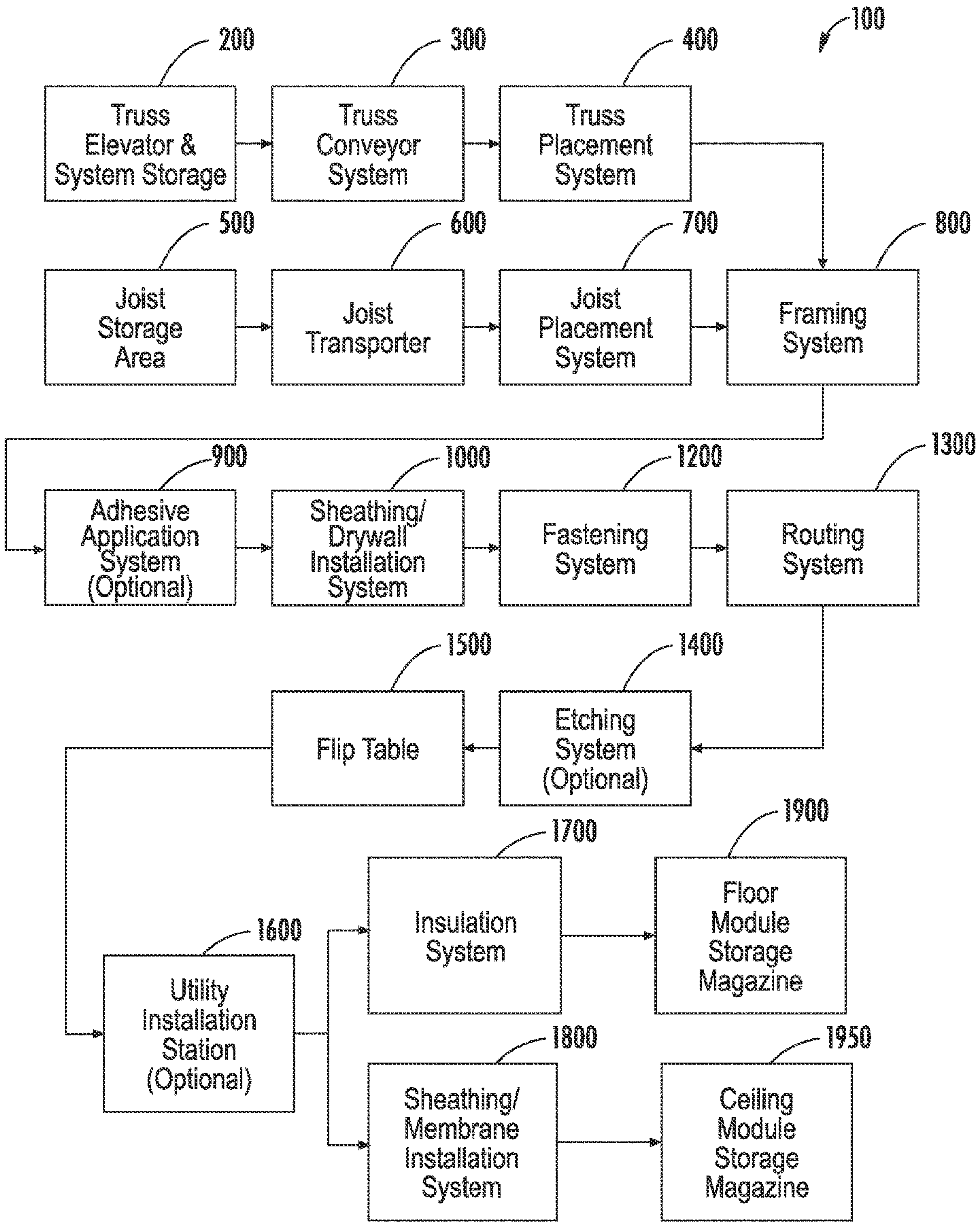

FIG. 1 is a schematic illustration of an example embodiment of a system for constructing flooring and ceiling sections of a modular construction unit.

Figure 2:
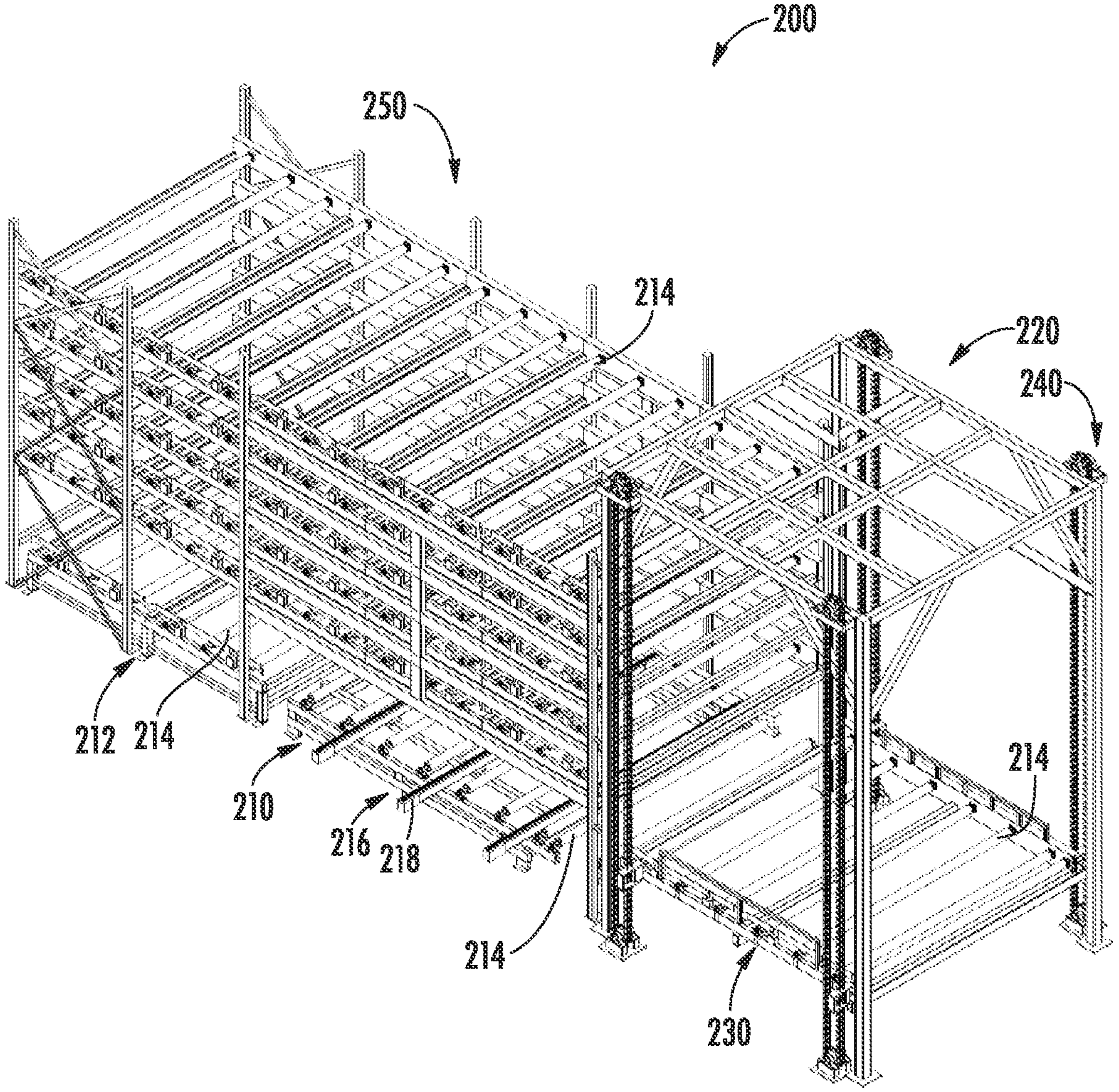

FIG. 2 is an isometric view of an example embodiment of the truss elevator and storage station, the elevator and storage station shown schematically in FIG. 1.

Figure 3:
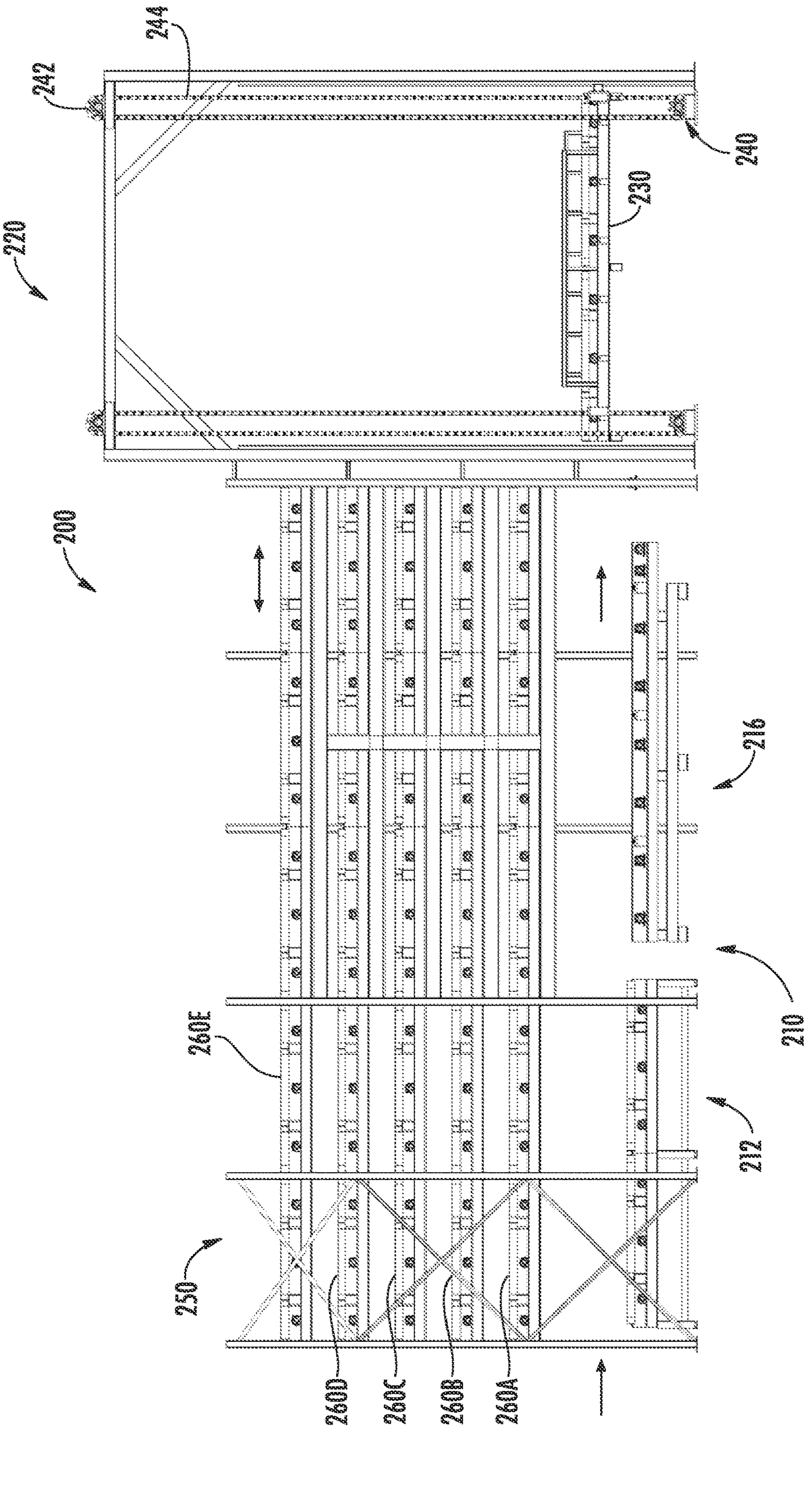

FIG. 3 is a side plan view of the example embodiment of the truss elevator and storage station shown in FIG. 2.

Figure 4:
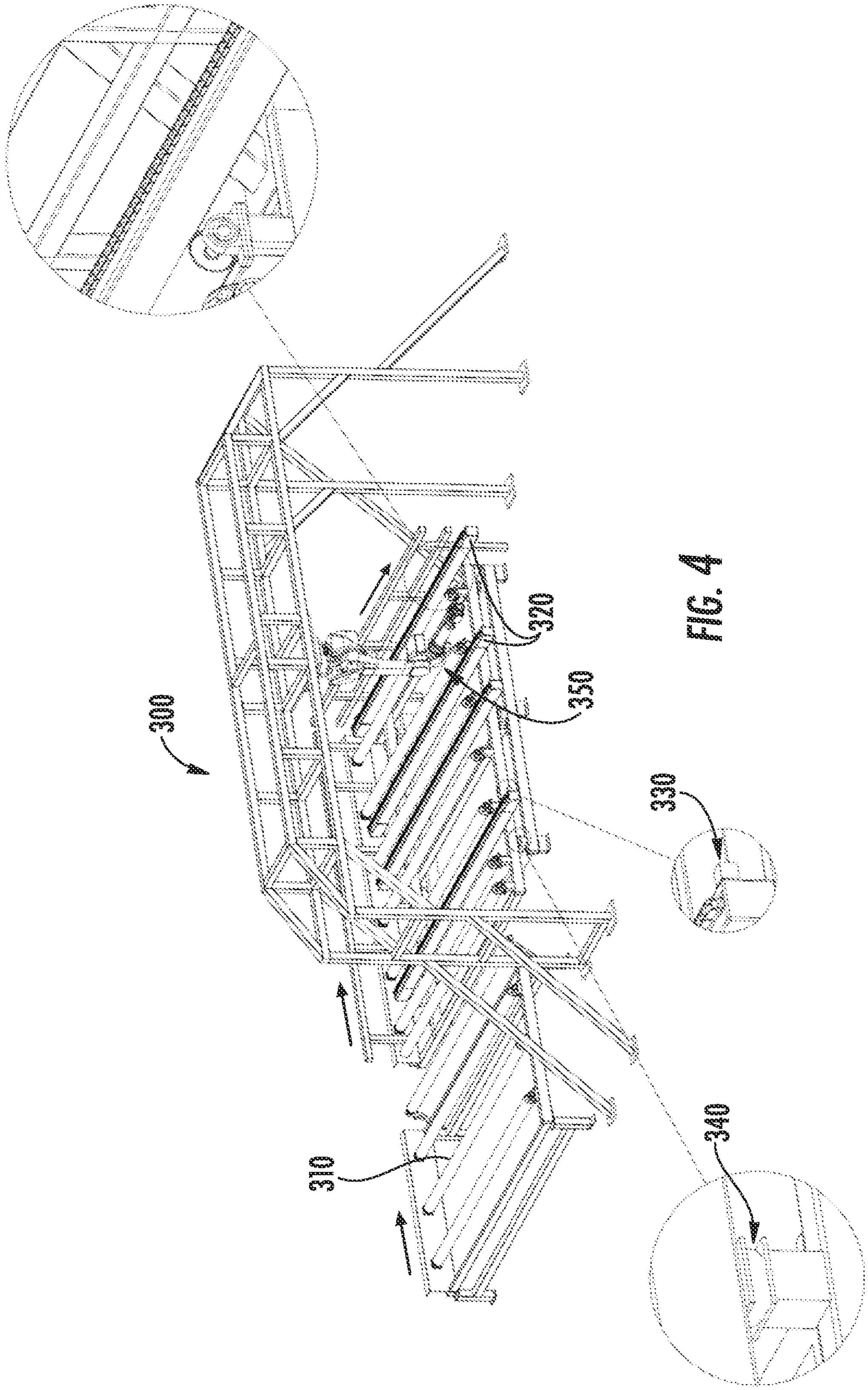

FIG. 4 is an isometric view of an example embodiment of a truss conveyor, the truss conveyor shown schematically in FIG. 1.

Figure 5:
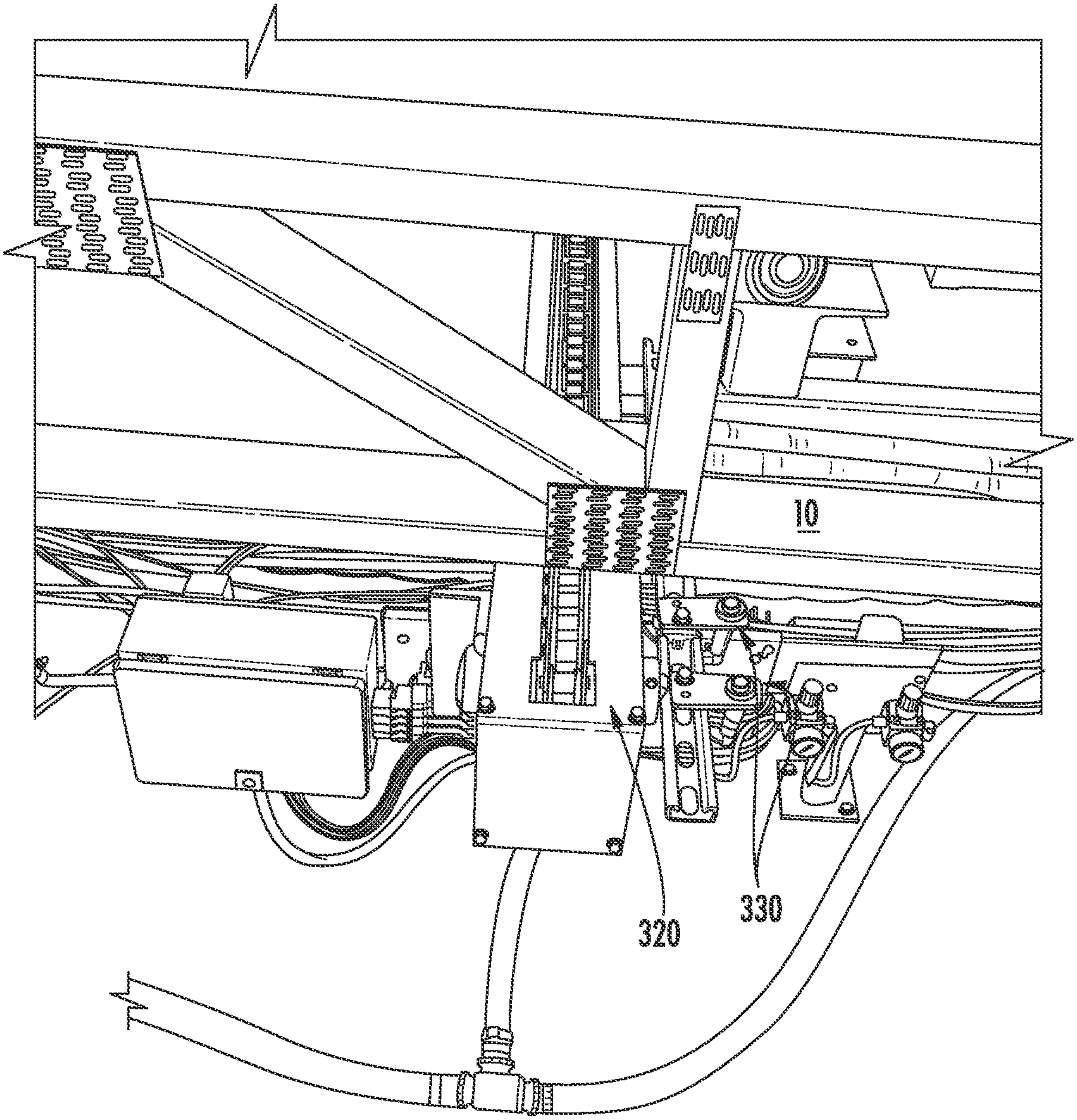

FIG. 5 is a detailed view of the truss conveyor shown in FIG. 4.

Figure 6:
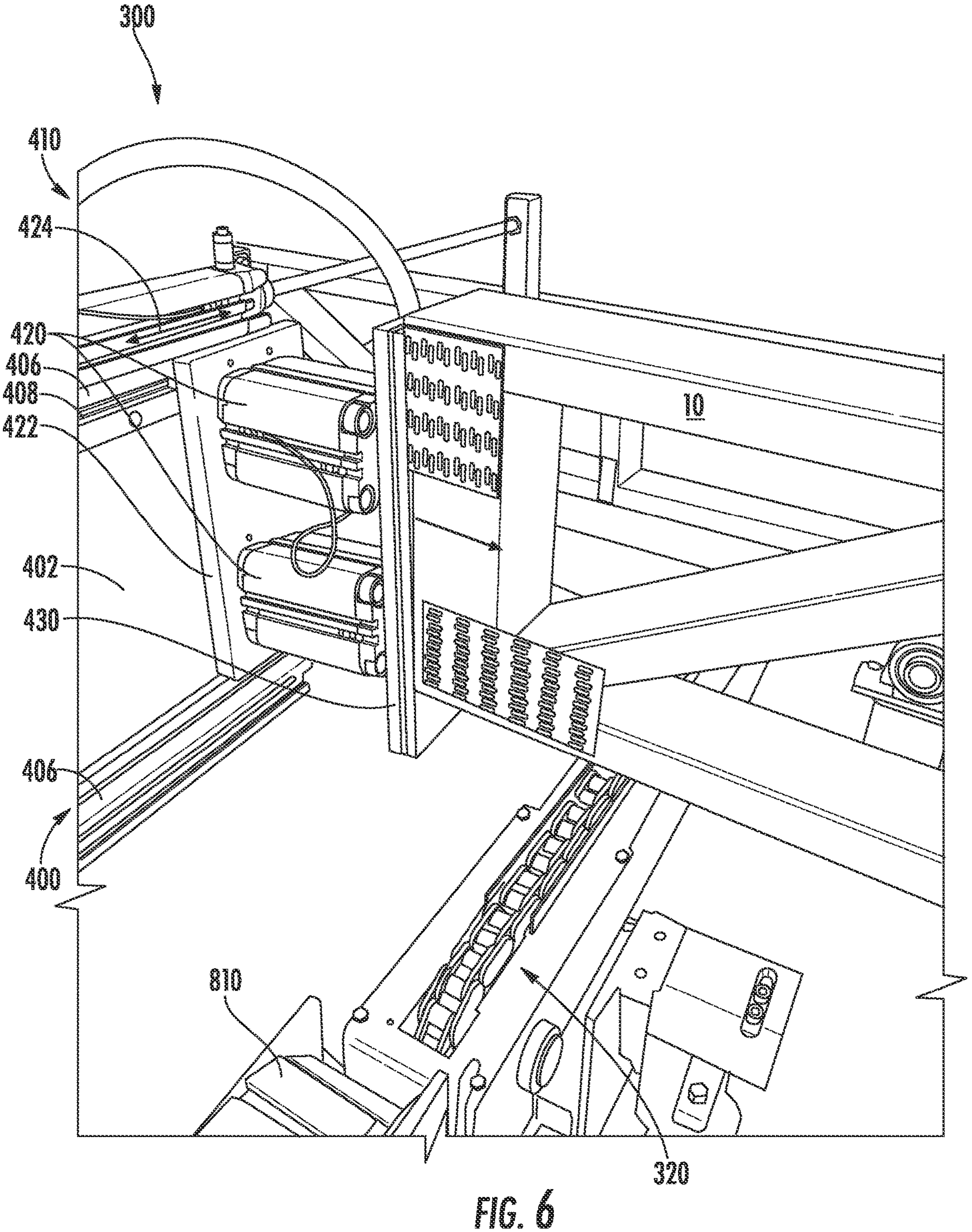

FIG. 6 is an isometric view of an example embodiment of the truss placement station, the truss placement station shown schematically in FIG. 1.

Figure 7:
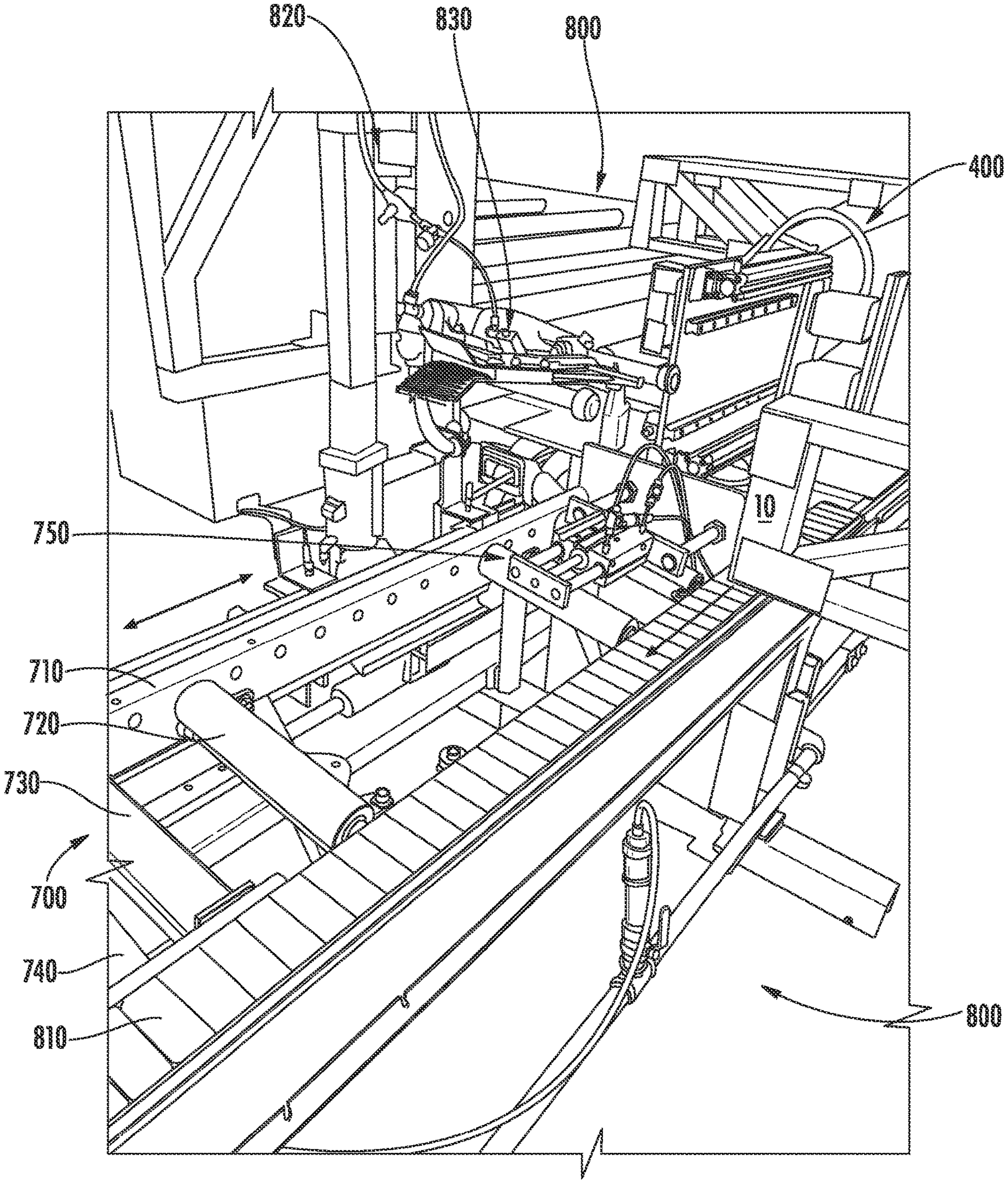

FIG. 7 is an isometric view of example embodiments of the joist storage area, the joist transporter, and the joist placement station, these stations shown schematically in FIG. 1.

Figure 8:
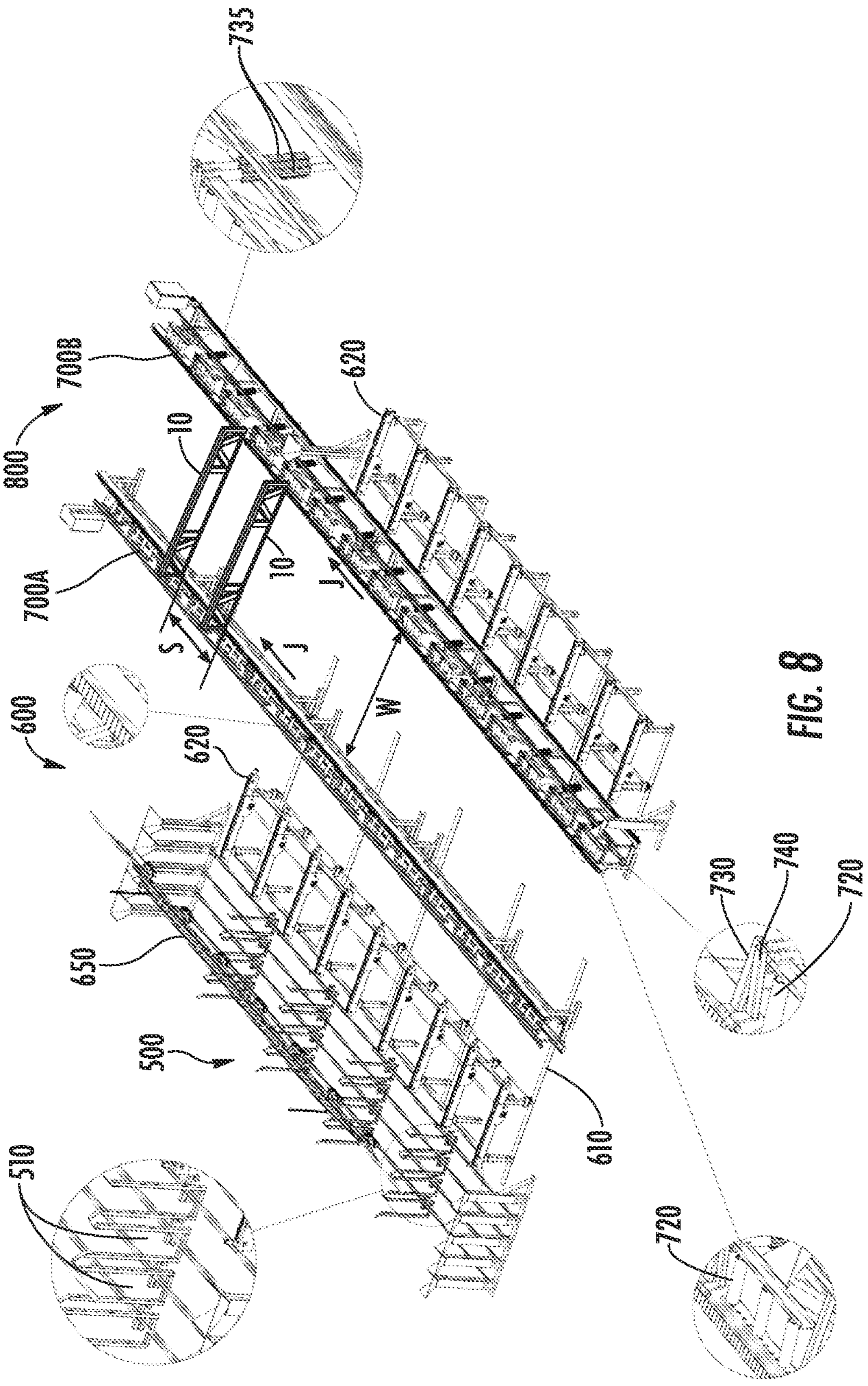

FIG. 8 is an isometric view of the joist storage area, the joist transporter, and the joist placement station shown in FIG. 7.

Figure 9:
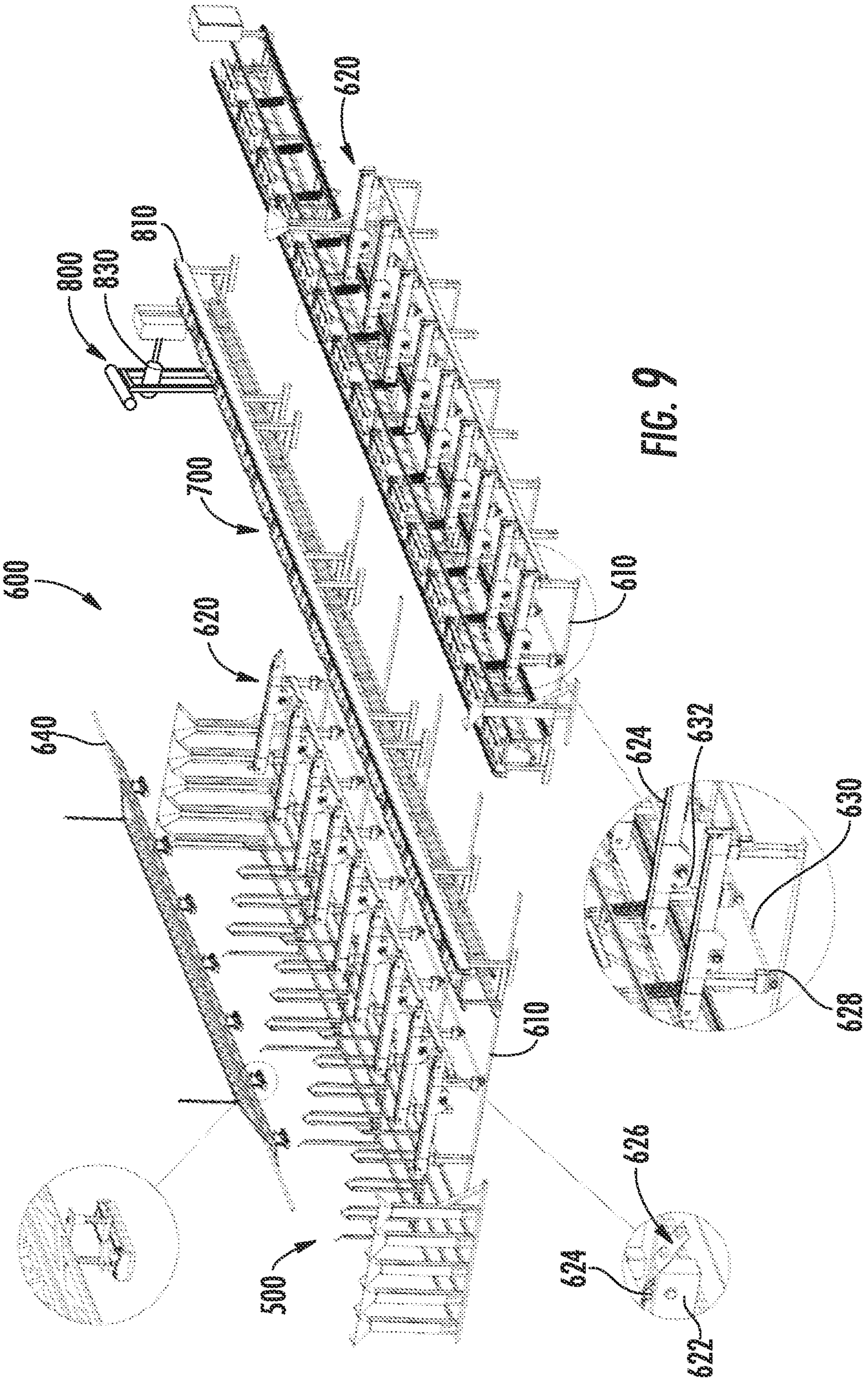

FIG. 9 is an isometric view of an example embodiment of the joist placement station shown in FIG. 7.

Figure 10:
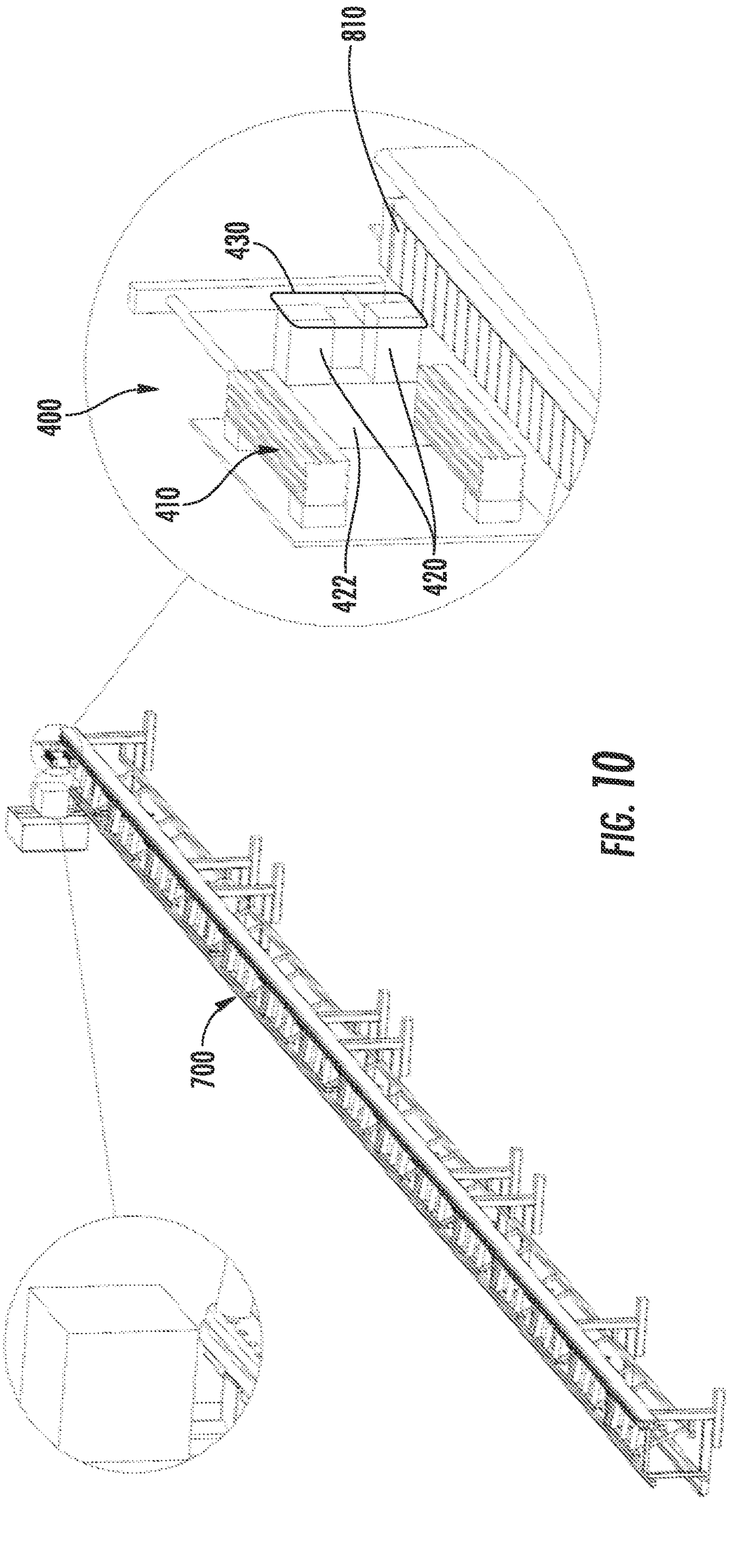

FIG. 10 is a detailed view of the joist placement station shown in FIG. 9.

Figure 11:
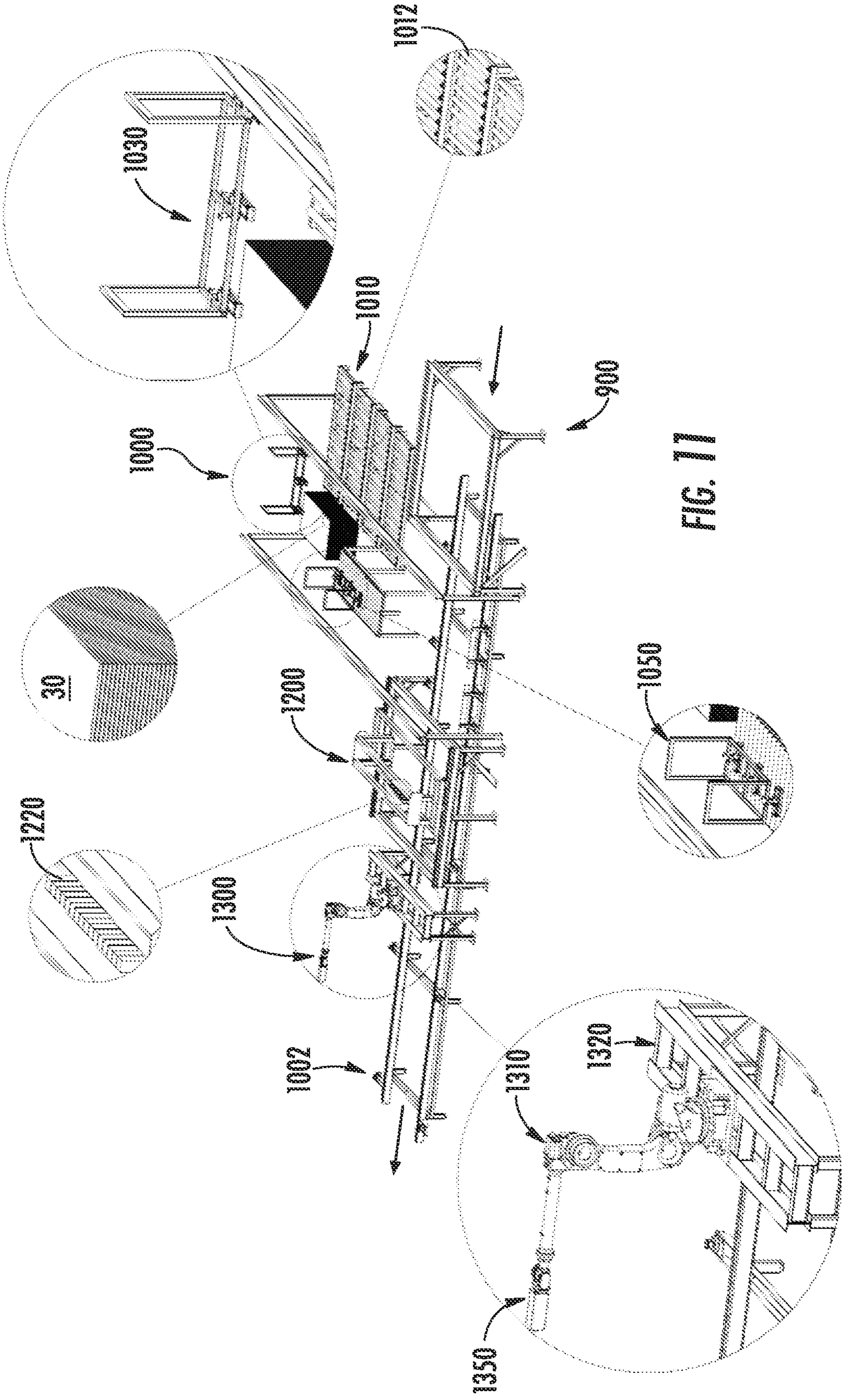

FIG. 11 is an isometric view of example embodiments of the adhesive station, the sheathing/drywall station, the fastening station, and the routing station, these stations shown schematically in FIG. 1.

Figure 12:
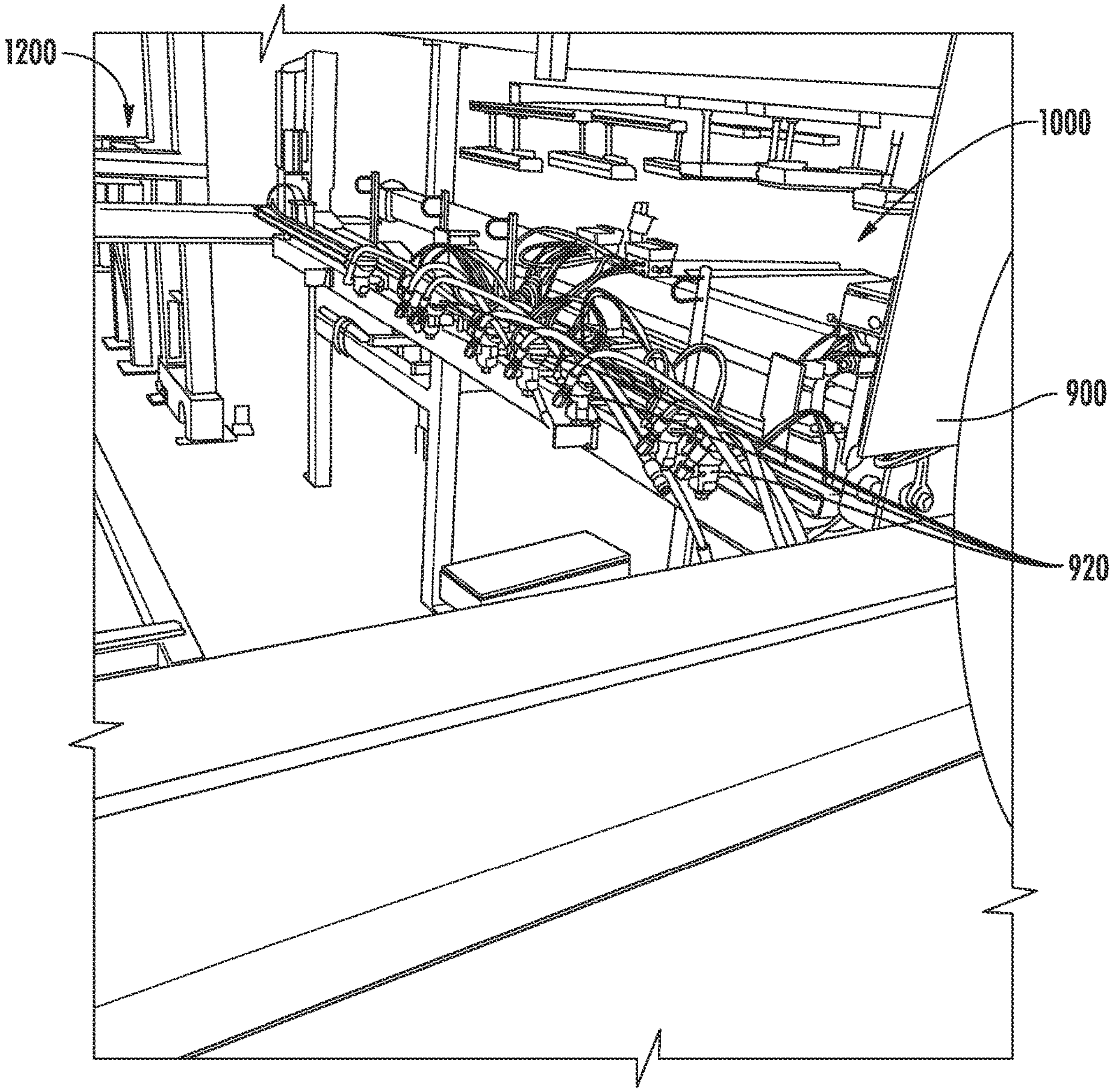

FIG. 12 is a detailed view of the adhesive station and the sheathing/drywall station shown in FIG. 11.

Figure 13:
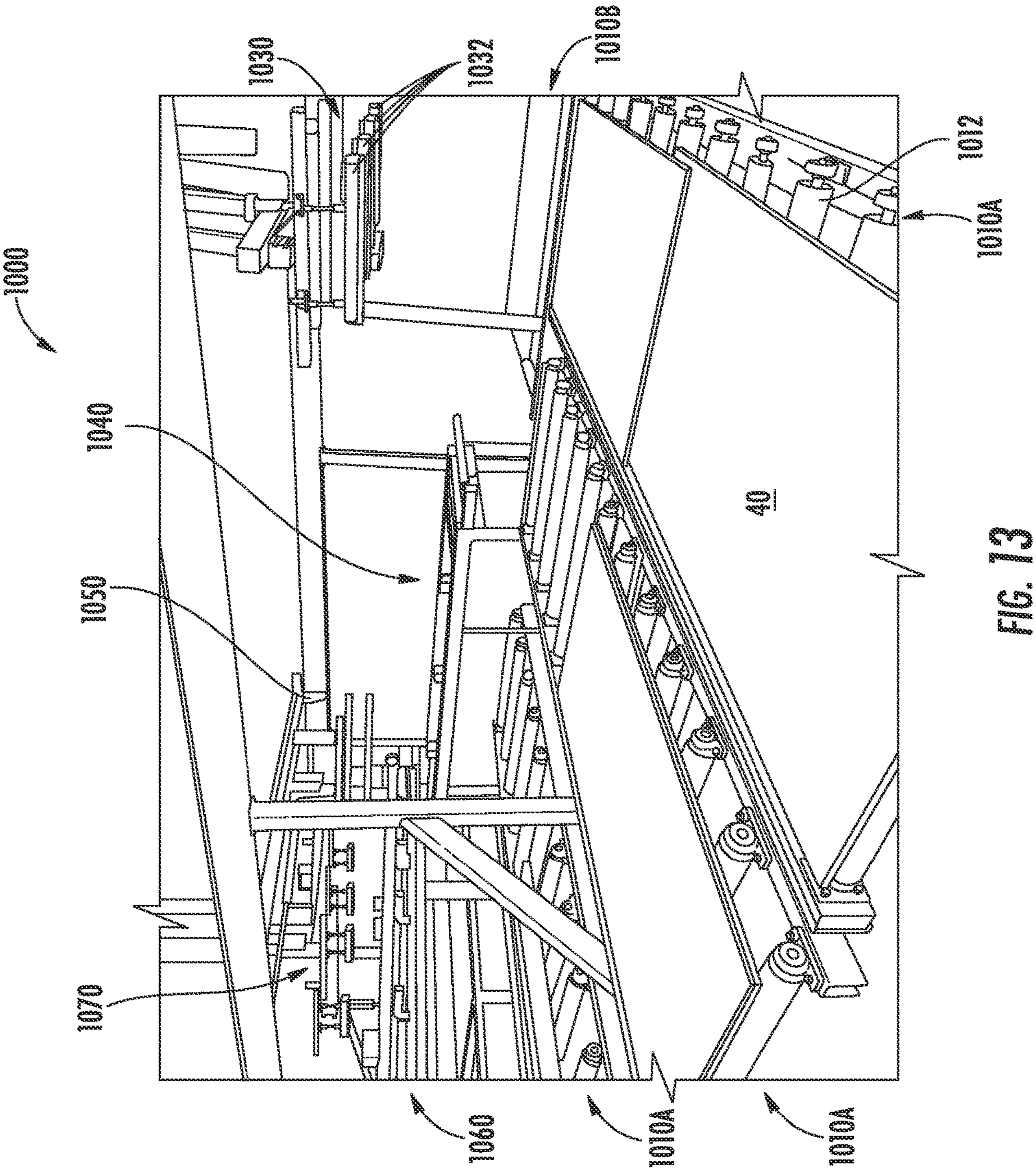

FIG. 13 is a front detailed view of the fastening station shown in FIG. 11.

Figure 14:
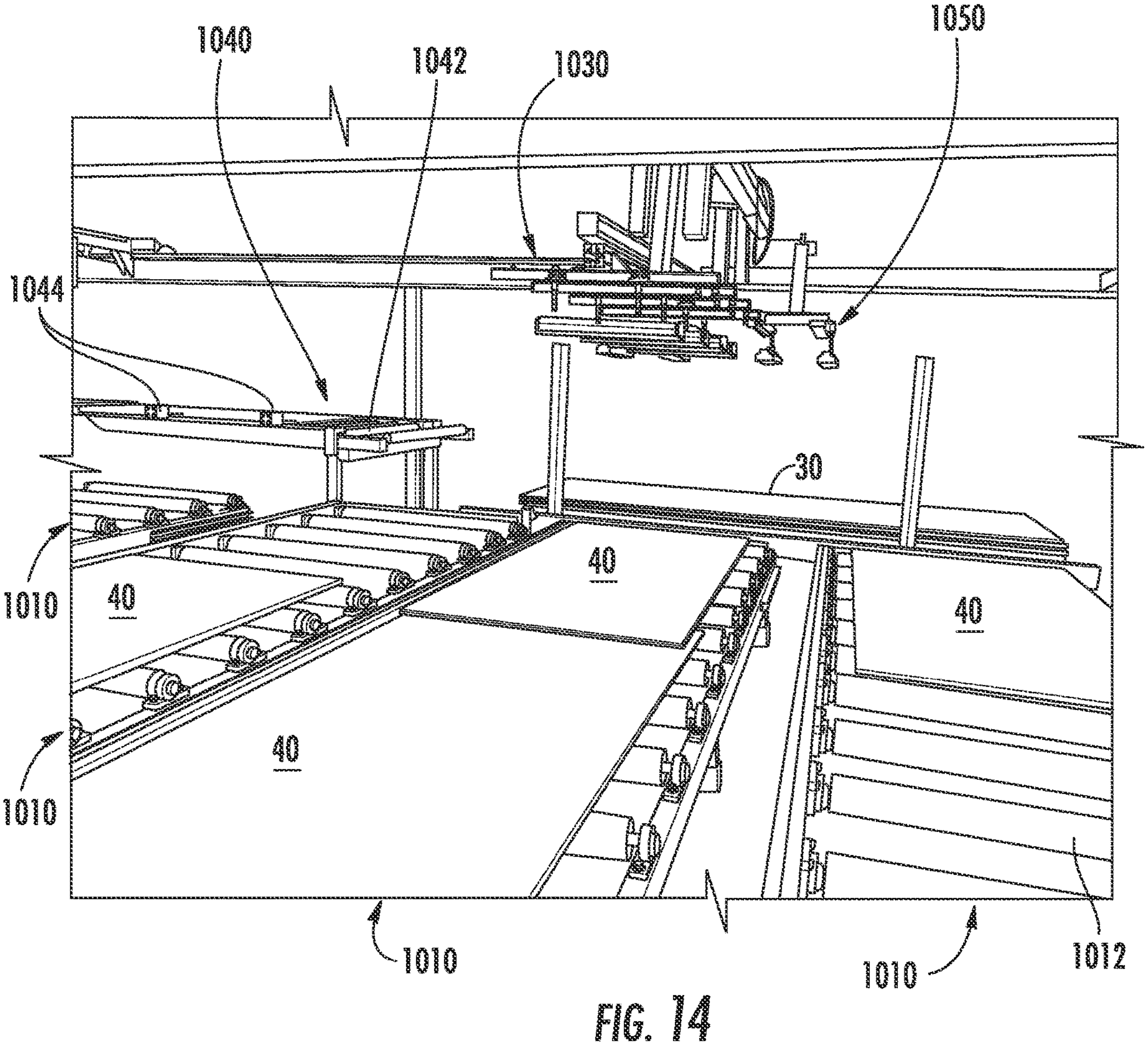

FIG. 14 is a side detailed view of the fastening station shown in FIG. 11.

Figure 15:
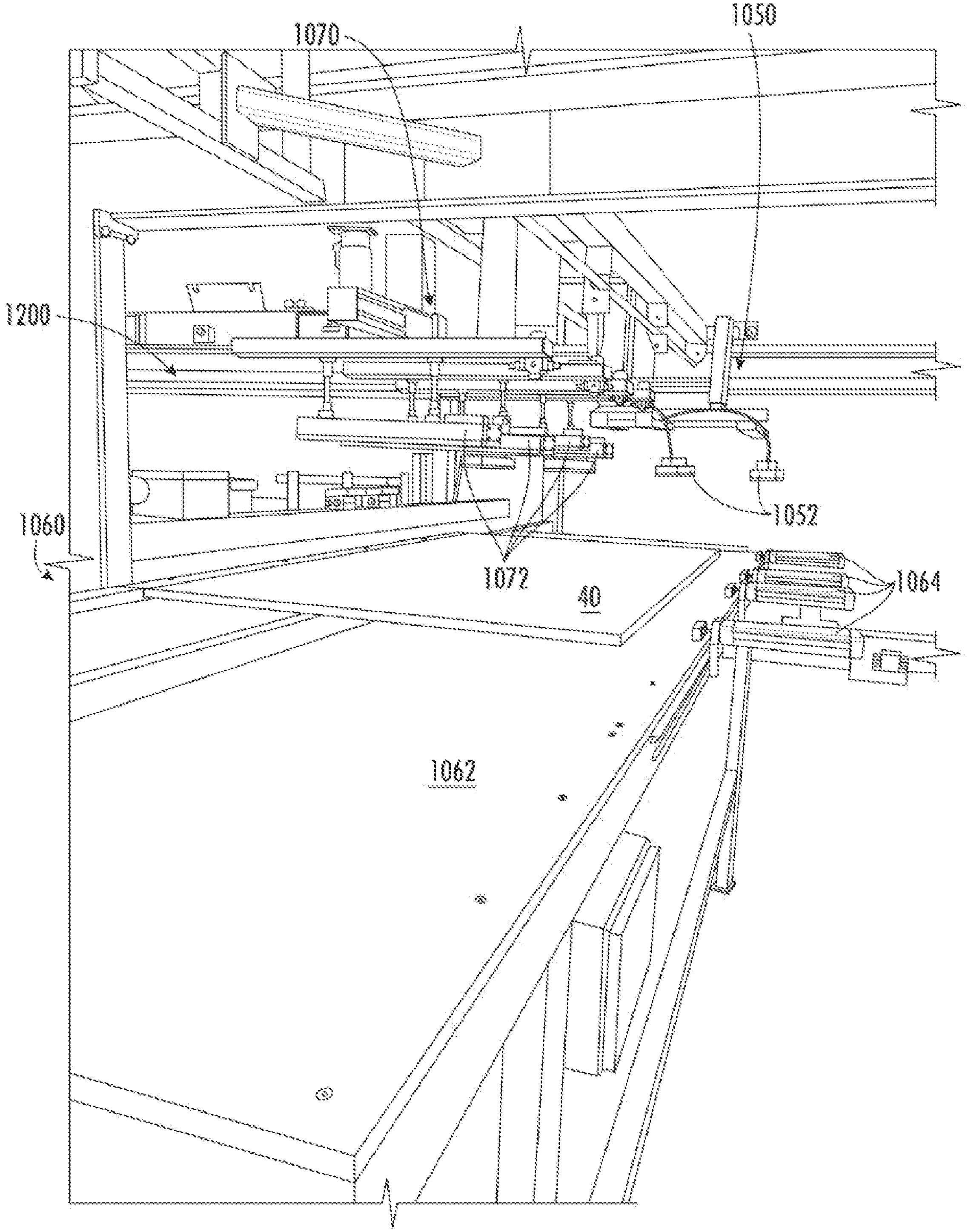

FIG. 15 is a detailed isometric view of the sheathing/drywall station shown in FIG. 11.

Figure 16:
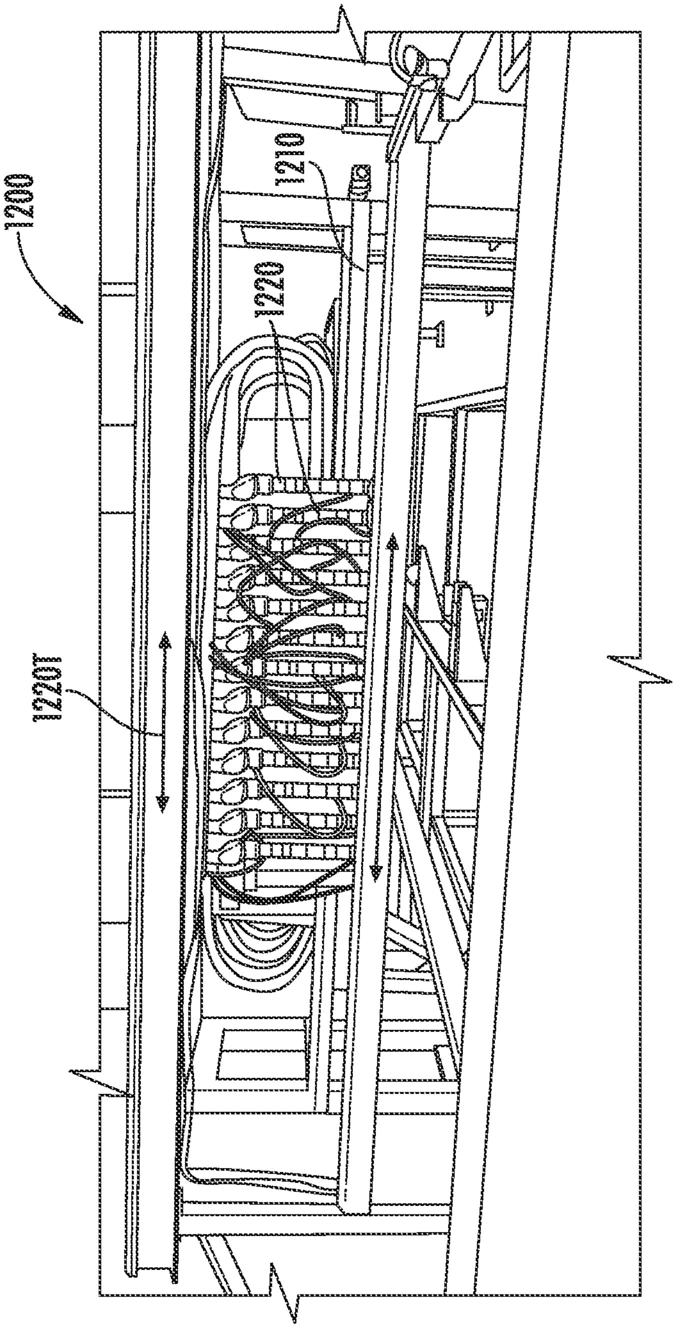

FIG. 16 is another detailed isometric view of the sheathing/drywall station shown in FIG. 11.

Figure 17:
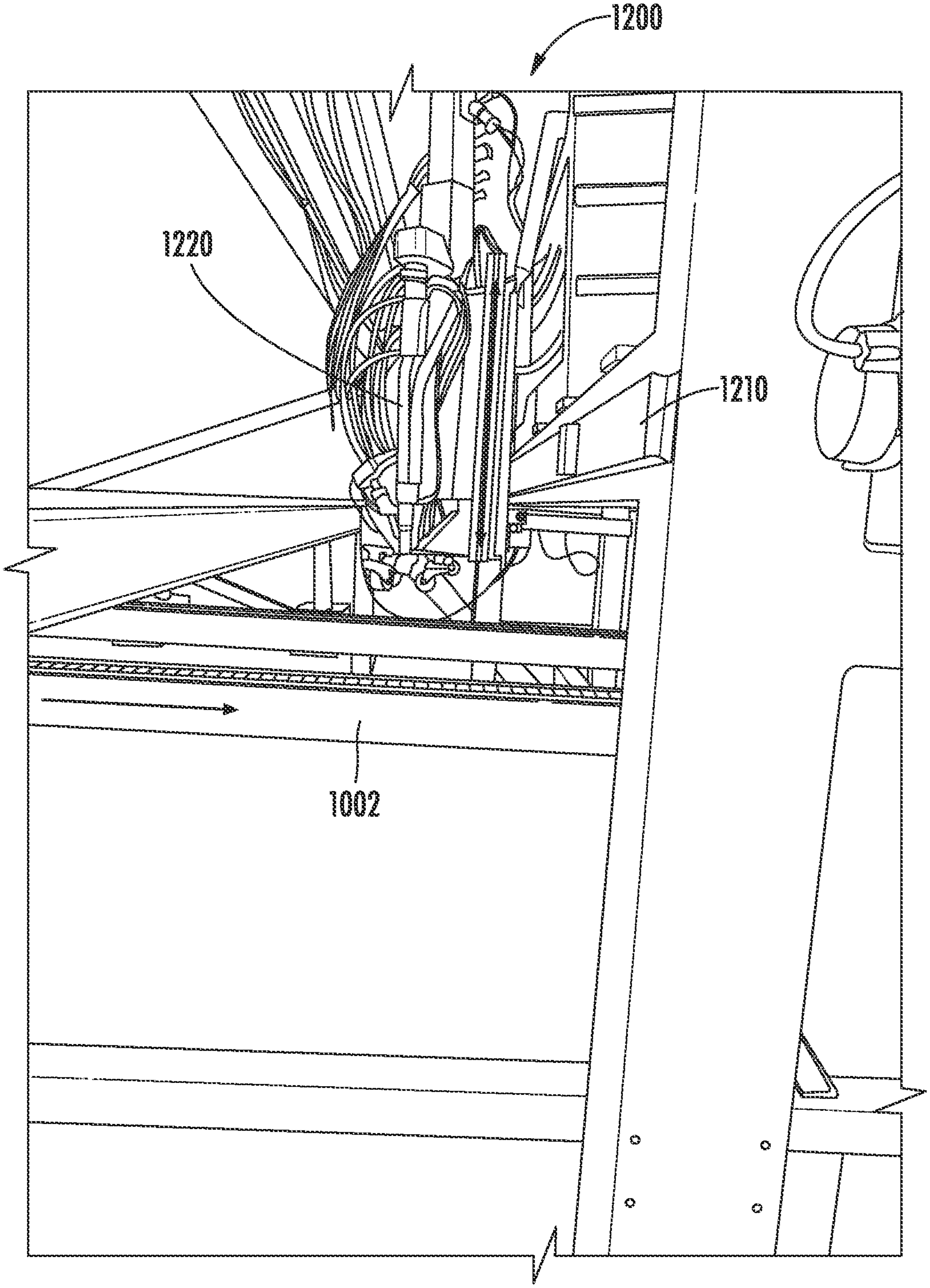

FIG. 17 is another detailed isometric view of the sheathing/drywall station shown in FIG. 11.

Figure 18:
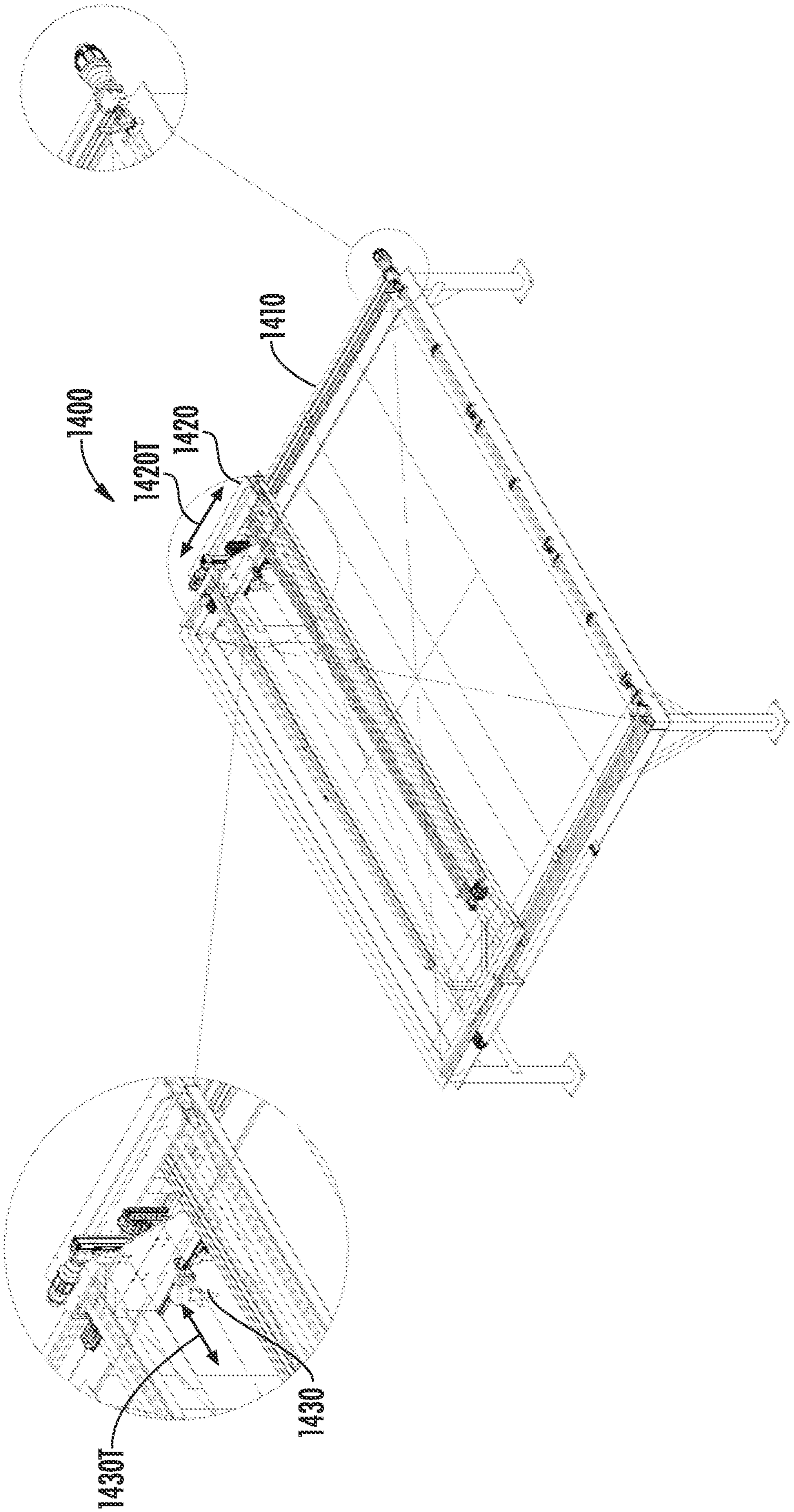

FIG. 18 is an isometric view of an example embodiment of the etching station, the etching station shown schematically in FIG. 1.

Figure 19:
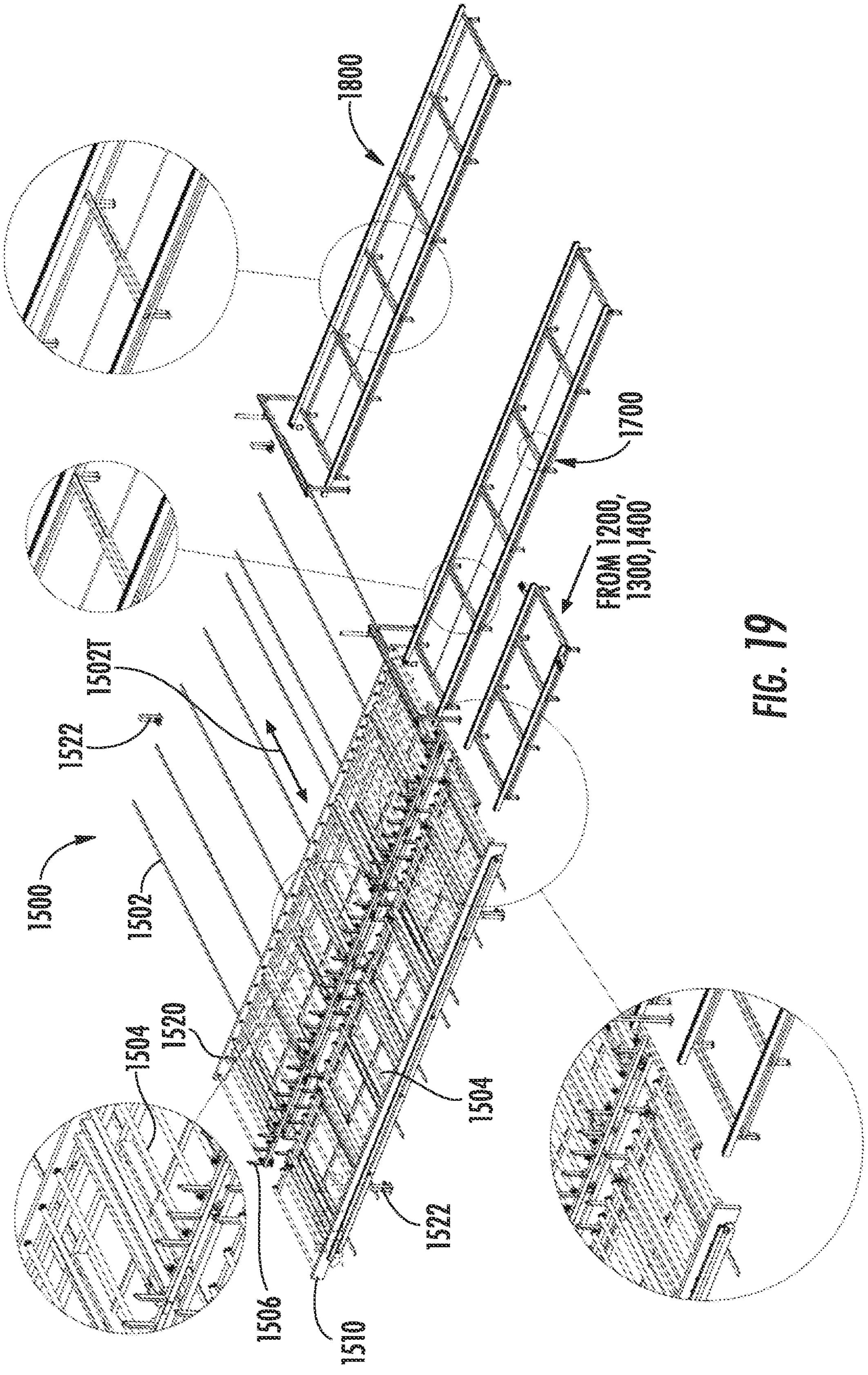

FIG. 19 is an isometric view of an example embodiment of the flip table, the flip table shown schematically in FIG. 1.

Figure 20:
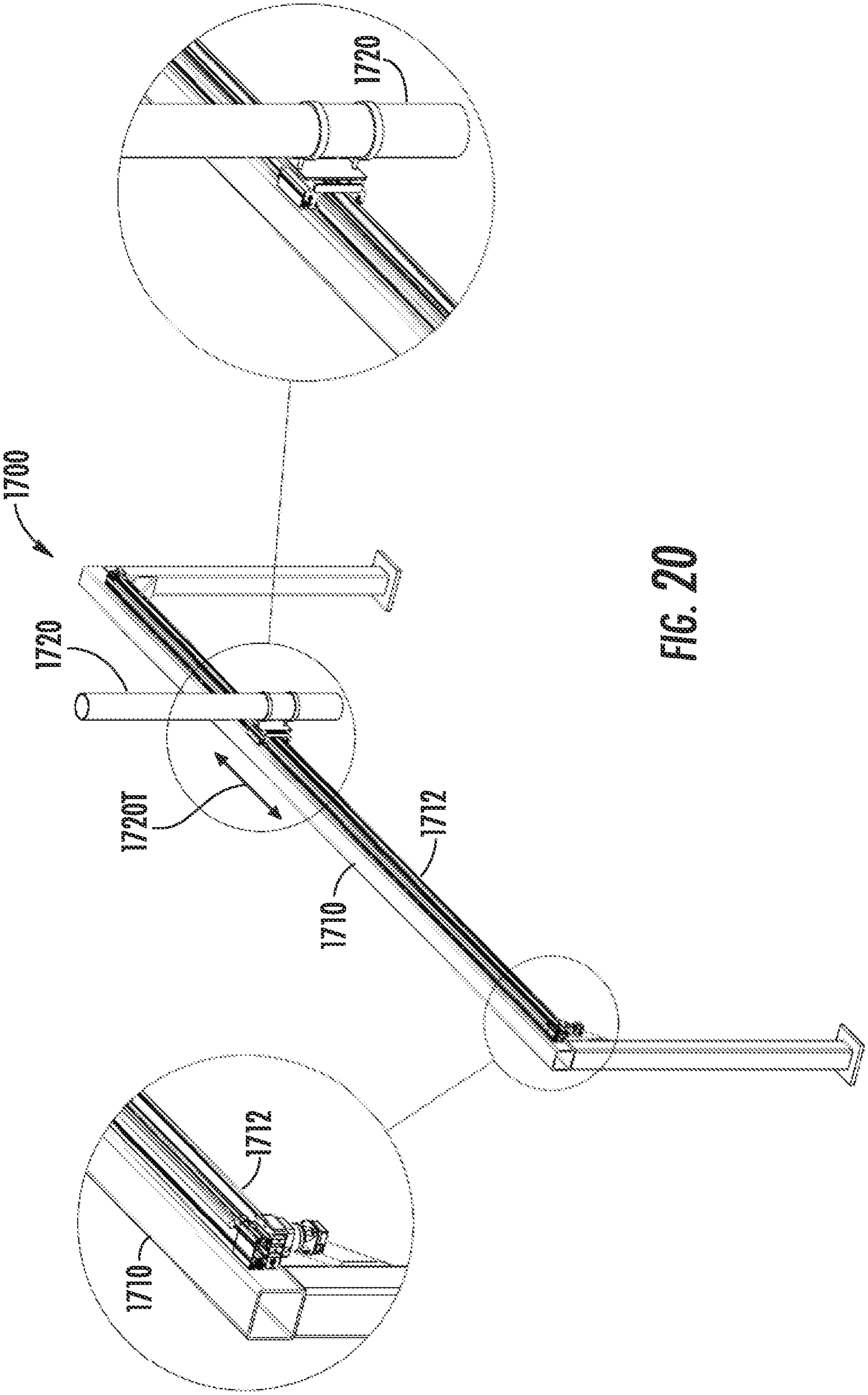

FIG. 20 is an isolated isometric view of an insulation installation system schematically illustrated in FIG. 1.

Figure 21:
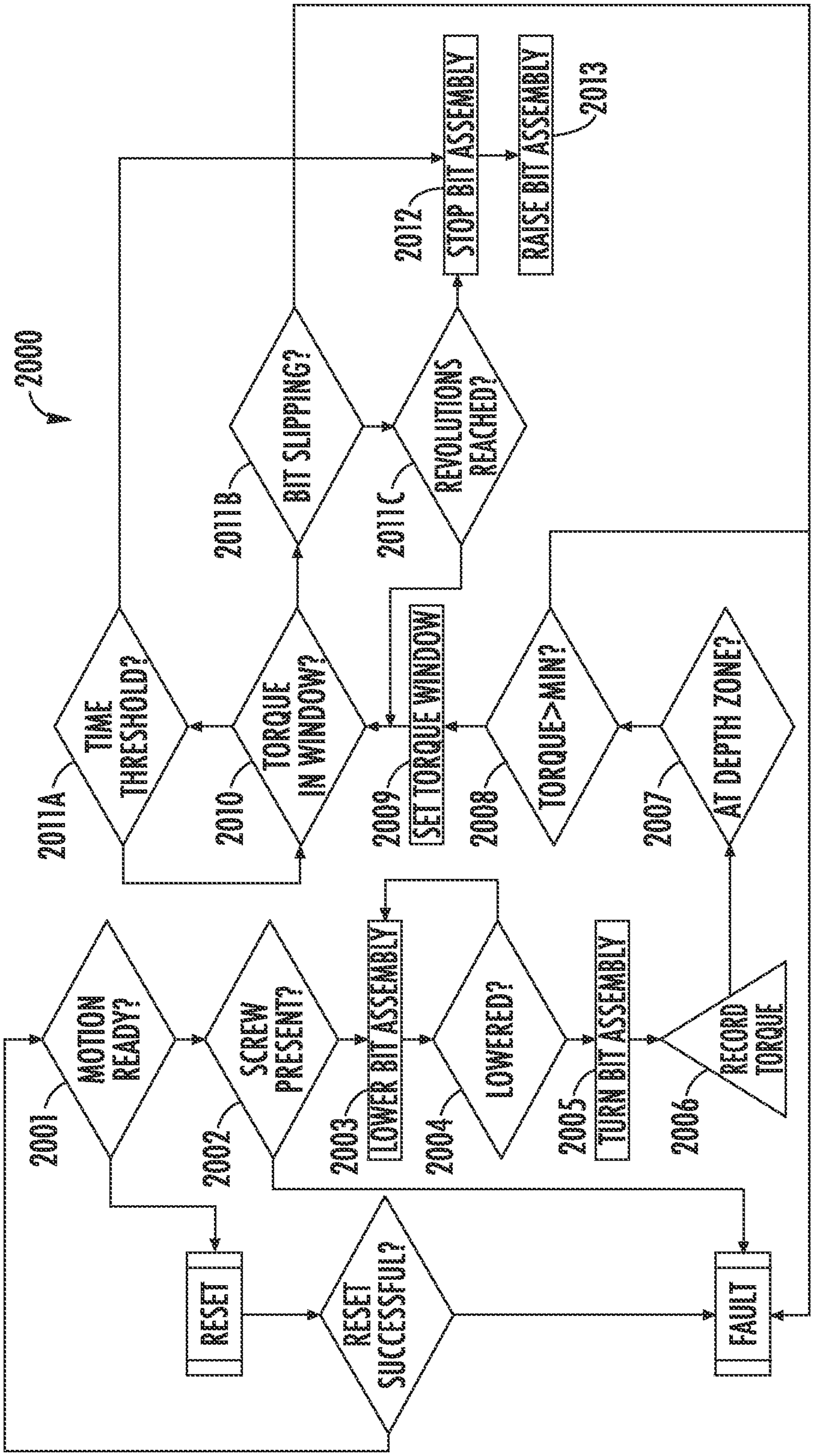

FIG. 21 is a flow chart for an example embodiment of a method for attaching objects together using an automated fastening system.

Figure 22:
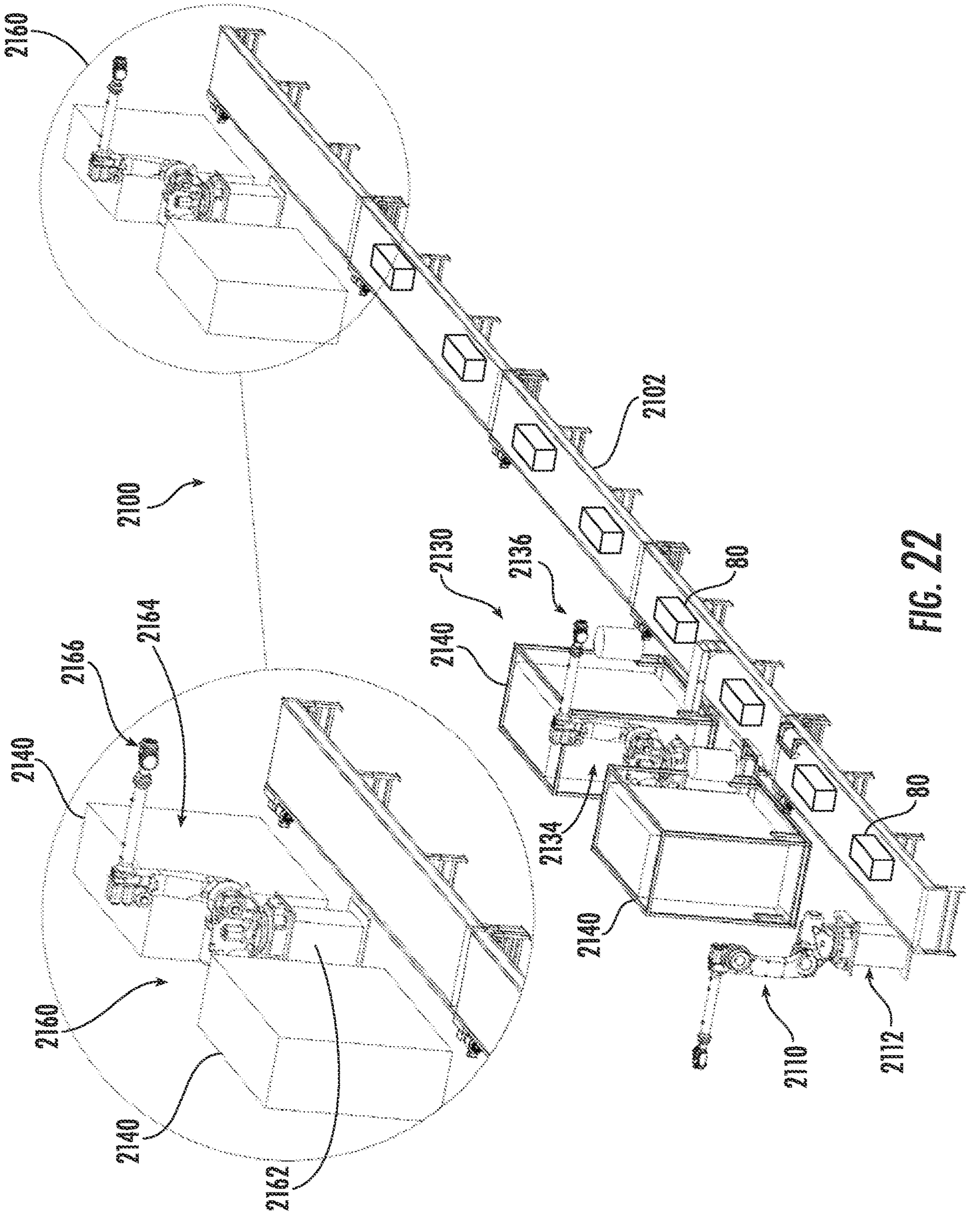

FIG. 22 is an isometric view of an example embodiment of an insulation loading station.

DETAILED DESCRIPTION

The presently disclosed subject matter now will be described more fully hereinafter, in which some, but not all embodiments of the presently disclosed subject matter are described. Indeed, the disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the present disclosure and the claims.

All publications, patent applications, patents and other references cited herein are incorporated by reference in their entireties for the teachings relevant to the sentence and/or paragraph in which the reference is presented.

Following long-standing patent law convention, the terms "a", "an", and "the" refer to "one or more" when used in this application, including the claims. Thus, for example, reference to "an element" includes a plurality of such elements, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the term "substantially," when referring to a value, an activity, or to an amount of a composition, mass, weight, temperature, time, volume, concentration, percentage, etc., is meant to encompass variations of in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed apparatuses and devices.

Referring now to FIG. 1, an example embodiment of a system, generally designated 100, for the manufacture of ceiling frame assemblies and/or flooring frame assemblies for assembly as a constituent component of a modular construction unit, which can be, for example, a modular room that is assembled in a factory, as a constituent component thereof. Such a modular construction unit can then, after assembly of its constituent components, including at least one ceiling frame assembly and at least one floor frame assembly, be transported in a substantially assembled state to a construction site and assembled into a modularly constructed structure (e.g., by being secured to other such modular construction units) to form a larger structure, such as, for example, a hotel constructed from a plurality of such modular construction units. While the system 100 is described herein according to an example embodiment, any of the features can be augmented, duplicated, replaced, removed, modified, etc. without deviating from the scope of the subject matter disclosed herein.

In this example embodiment, the system 100 comprises stations, which can each be physically separate and/or independent or combined in any possible combinations thereof, for manufacturing, assembling, forming, etc. various aspects of both ceiling frame assemblies and floor framing assemblies for the assembly of modular construction units. Typically, the system 100 is configured to only assembly a ceiling frame assembly or a floor frame assembly at a time, however it is envisioned that the system may be configured to form floor and ceiling frame assemblies in an alternating pattern, such that after a floor frame assembly is manufactured, the system will manufacture a floor frame assembly. In general, there are two initial work flow paths for the ceiling framing assemblies and the floor framing assemblies. The two flow paths merge into a single work flow path where the stations and method steps that are common to both framing assemblies (e.g., not unique), and then separate again for the finish work that is unique to each type of framing assembly.

A truss elevator and storage system 200 provides a storage area for prefabricated trusses that are loaded onto a feed-in system from, for example, a truss manufacturing system or other truss storage/supply area. The term truss, as used herein, includes, but is not limited to, dimensional lumber, manufactured lumber, and pieces of dimensional lumber that are assembled together to form a rigid framework (e.g., with a substantially rectangular outer frame with inclined cross-members arranged and attached therein to provide horizontal and vertical support to the outer frame). The truss elevator and storage system 200 raises the trusses, based on the physical characteristics of the trusses loaded onto the feed-in system, to a designated level within a truss storage rack, which comprises a multi-level storage rack for the storage of trusses or any other specified building material that may be designated to be loaded onto the feed-in system. The truss elevator and storage system 200, upon receipt of a command from a controller, retrieves one or more (e.g., a plurality of) trusses from a designated level of the truss storage rack on which the one or more trusses are indicated (e.g., in a database) as being stored. The truss elevator and storage system then lowers the designated truss(es) from the level where they were stored within the multi-level storage rack to a transport level and then transports (e.g., using a plurality of rollers, which may be any combination of drive and idler rollers, including exclusively driven rollers) the plurality of trusses, via a truss conveyor system 300 to a truss placement system 400. While the trusses are being transported, loaded, retrieved, etc. by the truss elevator and storage system 200, the truss conveyor system 300, and/or the truss placement system 400, joists (e.g., made from natural and/or manufactured dimensional lumber) are loaded, whether in an automated fashion or manually, and stored in a joist storage area 500. A joist transporter 600 moves the joists to a joist placement system 700, where the joists are arranged, relative to the trusses. The joist transporter 600 can be, for example, an overhead crane or gantry or any other suitable device or system for transporting the joists to the joist placement system 700.

With the trusses and the joists specified for the manufacture of a ceiling framing assembly or a floor framing assembly located at and arranged by, respectively, at the truss placement system 400 and the joist placement system 700, the joists and trusses are processed (e.g., assembled together by suitable fasteners) at a framing system 800. At the framing system 800 the trusses and/or joists are assembled and/or attached together to form the generally planar floor or ceiling framing assembly that will ultimately be integrated into a modular construction unit as a floor or ceiling surface thereof. The framing assembly is then transported, for example, by a frame transport (e.g., any suitable type of conveyor, including a segmented plate, belt, or chain conveyor) to an adhesive application system 900, which may be omitted in some embodiments. Adhesive application system 900 comprises a plurality of adhesive applicators that apply an adhesive substance (e.g., a glue, epoxy, etc.) onto the upper surfaces of the trusses and/or joists of the framing assembly to secure drywall panels (for a ceiling framing assembly) or sheathing panels (for a flooring framing assembly) to the framing assembly being manufactured.

The framing assembly is then transported, via a frame transport, which may be the same as (e.g., a continuous conveyor) or physically distinct from the frame transport of the adhesive application system 900 to the sheathing/drywall installation system 1000. At the sheathing/drywall installation system 1000, a plurality of sheathing panels (e.g., for a flooring framing assembly) or a plurality of drywall panels (e.g., for a ceiling framing assembly) are applied over, in contact with, and/or bonded to the upper surfaces of the trusses and the joists, which may be covered by the optional adhesive material from the adhesive applicators of the adhesive application system 900.

After the sheathing panels and/or the drywall panels are positioned over the framing assembly at the sheathing/drywall installation system 1000, the framing assembly, with the drywall panels or the sheathing panels arranged thereon, is transported (e.g., via a frame transport, which can be substantially similar to, or the same as, the frame transports disclosed elsewhere herein regarding the transport of the framing assembly to, through, underneath, etc. the adhesive application system 900 and the sheathing/drywall installation system 1000) to a fastening system 1200, at which an array of fastening devices is arranged thereover, in a position adjacent the exterior surface of the drywall panels or the sheathing panels, as the case may be depending on whether a ceiling framing assembly or a flooring framing assembly is being processed. The plurality of fastening devices apply a plurality of fasteners through the sheathing panels or the drywall panels to mechanically secure the sheathing panels or the drywall panels, as the case may be, to the trusses and/or the joists of the framing assembly being assembled.

After the sheathing panels or the drywall panels are attached to the trusses and/or the joists at the fastening system 1200, the framing assembly is now ready for further customization, depending on whether the framing assembly is to be manufactured as a flooring framing assembly or a ceiling framing assembly. The framing assembly is then transported (e.g., via a frame transport, which can be substantially similar to, or the same as, the frame transports disclosed elsewhere herein regarding the transport of the framing assembly to, through, underneath, etc. the adhesive application system 900, the sheathing/drywall installation system 1000, and the fastening system 1200) from the fastening system 1200 to a routing system 1300, where a routing robot mounted (e.g., on a frame over the frame transport) performs any necessary routing operations, such as, for example, cutting holes, on the outer surface of the framing assembly to which the drywall panels or the sheathing panels are attached. In embodiments where no routing operations are needed, the routing system 1300 can be deactivated or omitted entirely from the system 100.

After any specified routing operations (e.g., in a set of instructions provided to a controller for the particular flooring framing assembly or ceiling framing assembly being constructed) are performed on the sheathing panels or the drywall panels, an etching system 1400 may be provided, comprising, for example, a laser or rotary etching tool to create construction markings, such as keep-outs, fixture locations, and other markings that may be advantageously be included to indicate placement of various components or other assembly instructions (e.g., an outline indicating "no carpet here" in a region underneath a bed frame) during final assembly of the modular construction unit after the ceiling framing assembly and/or the flooring framing assembly is/are assembled with the other constituent components (e.g., a wall framing assembly) of the modular construction unit. In some embodiments, a common (e.g., same) frame transport can be provided for transporting the framing assembly being manufactured through, adjacent to, under, etc. both the routing system 1300 and the etching system 1400. In some other embodiments, separate frame transports may be provided at the routing system 1300 and the etching system 1400 to transport the framing assembly. Regardless of whether the frame transport of the routing system 1300 is common or distinct from (e.g., physically separate from) the frame transport of the etching system 1400, the frame transport of the routing system 1300 and/or the etching system 1400 can be substantially similar to, or the same as, the frame transports disclosed elsewhere herein regarding the transport of the framing assembly to, through, underneath, etc. the adhesive application system 900, the sheathing/drywall installation system 1000, and the fastening system 1200). In some embodiments, the etching system 1400 may even be deactivated and/or omitted entirely.

After any specified etching operations are performed on the sheathing panels or the drywall panels at the etching system 1400, the framing assembly being assembled is transported onto a butterfly flip table 1500, which inverts the framing assembly so that the sheathing panels or the drywall panels face downward. The framing assembly may then be transported (e.g., via a frame transport, which can be substantially similar to, or the same as, the frame transports disclosed elsewhere herein regarding the transport of the framing assembly to, through, underneath, etc. the adhesive application system 900, the sheathing/drywall installation system 1000, the fastening system 1200, the routing system 1300, and/or the etching system 1400) to a utility installation system 1600, in which any specified utilities, such as, for example, electrical wiring, plumbing, telecommunications, HVAC devices and/or ductwork, and the like, as well as any devices (e.g., electrical junction boxes, HVAC return and/or supply registers, and the like) to be housed internal to the ceiling framing assembly or the flooring framing assembly, including through-holes, cavities, and the like formed through the trusses to connect adjacent cavities defined between adjacent trusses.

Depending on whether a flooring framing assembly or a ceiling framing assembly is being manufactured, the framing assembly is then transported (e.g., via a frame transport, which can be substantially similar to, or the same as, the frame transports disclosed elsewhere herein regarding the transport of the framing assembly to, through, underneath, etc. the adhesive application system 900, the sheathing/drywall installation system 1000, the fastening system 1200, the routing system 1300, and/or the etching system 1400) to the flooring finish area or the ceiling finish area.

In the flooring finish area, a suitable insulation material is installed (e.g., blown) to fill a designated internal portion of the flooring framing assembly from an opposite side of the flooring framing assembly from the side thereof to which the sheathing panels are attached at an insulation system 1700. The insulation material can be any suitable material, including, for example, a blown cellulose material having a predetermined moisture content to achieve a desired insulation density. The insulation material is installed to have a predetermined density value. In order to ensure that the insulation is sufficiently retained within the flooring framing assembly, a layer of retention material (e.g., in a form of a netting or any other suitable type of material) may be attached to the flooring framing assembly to cover the insulation material.

In the ceiling finish area, a layer of a suitable membrane material (e.g., a substantially continuous sheet or plurality of sheets that form a barrier to moisture, so as to be substantially watertight) is attached over an opposite side of the ceiling framing assembly from the side thereof to which the drywall panels are attached at a sheathing/membrane installation system 1800. In some embodiments, a substantially continuous layer of sheathing panels is attached at the sheathing/membrane installation system 1800 over (e.g., to cover substantially all of) the layer of membrane material to enclose the ceiling framing assembly. In some embodiments, prior to application of the layer of the membrane material to the ceiling framing assembly, an insulation material may be installed within the ceiling framing assembly in substantially a same manner as the insulation material is installed within the flooring framing assembly at the insulation system 1700. While the layer of retention material may be omitted herein in lieu of the layer of membrane material, the layer of retention layer may nevertheless be provided in addition to the layer of membrane material in some embodiments. The widths of the frame transports of one or more (e.g., all) of the systems disclosed herein along which the framing assembly is transported during the manufacture thereof can be varied (e.g., by laterally expanding the frame thereof) to allow for the manufacture of a plurality of differently dimensioned framing assemblies. The tracks of such frame transports that are in contact with the framing assembly can therefore be spaced apart to any of a plurality of different widths depending on the width of the framing assembly being manufactured.

The finished flooring and ceiling framing assemblies are then transported (e.g., via a frame transport, which can be substantially similar to, or the same as, the frame transports disclosed elsewhere herein regarding the transport of the framing assembly) to the respective storage magazines 1900, 1950.

Referring now to FIGS. 2 and 3, an example embodiment of a truss elevator and storage system, generally designated 200, is illustrated. In the example embodiment shown, one or more pre-fabricated trusses are provided and illustrated throughout the system 100, however the term "truss" as used herein may include any suitable dimensional support member, including, by way of example and not limitation, metallic support structures, natural lumber, engineered dimensional lumber (e.g., beams having a cross-section in a shape of an I, T, L, or any other suitable shape), and manufactured wooden structures comprising a plurality of wooden members arranged and attached together to provide vertical and/or lateral support.

The elevator and storage system 200 comprises a feed-in system, generally designated 210, onto which one of more trusses (e.g., a plurality of trusses) are loaded, whether manually or via an automated process, from a truss supply area adjacent an inlet of the feed-in system 210. In some embodiments, the truss supply area comprises an outlet of a truss assembly system. The feed-in system 210 comprises, in the example embodiment shown, at least two base roller sections 212, 216 along which the trusses are transported onto a truss elevator, generally designated 220. In the embodiment shown, the trusses are loaded into a first base roller section 212 and transported therealong by a plurality of rollers 214 rotatably attached to the frame of the first base roller section 212.

The trusses are then transported from the first base roller section 212 onto the second base roller section 216, which also comprises a plurality of rollers 214 that move the trusses in contact therewith in substantially the same direction as the rollers 214 of the first base roller section 212. The second base roller section 216 also comprises a plurality of position registration tracks 218, which are configured to be raised (e.g., pneumatically, hydraulically, by one or more electrical motors, etc.) above the plane in which the rollers 214 of the second base roller section 216 contact the trusses being transported thereon. These position registration tracks 218, when raised above the contact plane of the rollers 214, lift the trusses away from the rollers 214 and the position registration tracks 218 then laterally move the trusses in a direction transverse (e.g., perpendicular) to the direction along which the trusses are transported by the rollers 214 such that the trusses contact and are driven against one or more registration stops that are attached to, or adjacent to, the second base roller section 216. The position registration tracks 218 can be, for example, a segmented plate, belt, or chain conveyor configured to frictionally engage with the trusses in contact therewith and drive the trusses against the one or more registration stops. After the trusses are positionally registered (e.g., moved to a known position) by the position registration tracks 218, the position registration tracks 218 are lowered below the contact plane of the rollers 214 and the trusses continue to be transported by the rollers 214 of the second base roller section 216 onto the platform 230 of the truss elevator 220.

In some embodiments, a position sensor may be provided to ensure that the rollers 214 of the second base roller section 216 are not energized and/or activated to transport the trusses onto the platform 230 unless the platform 230 is detected by the position sensor in a transport position, in which, for example, the contact surface of the rollers 214 of the platform 230 are substantially coplanar with the contact surface of the rollers 214 of the second base roller section 216. In some embodiments, this position sensor may be a distance sensor that detects a position of the platform from a known position to determine a vertical position of the platform 230 (e.g., to determine when the platform 230 is at a height where the contact surface of the rollers 214 of the platform 230 is substantially coplanar with the rollers 214 of one of the shelves of the truss storage rack 250) In such embodiments, it is contemplated that trusses may not be loaded onto, or retrieved from, any of the shelves of the truss storage rack 250 unless the position sensor detects that the platform 230 is properly aligned with either of the second base roller section 216 or any of the shelves of the truss storage rack 250.

The truss elevator 220 comprises a vertically mobile platform, generally designated 230, on which the trusses transported onto the truss elevator are supported. The truss elevator 220 is configured to raise the platform 230, as well as the trusses supported therein, to a level of one of a plurality of shelves 260A-E of the multi-level truss storage rack 250 on which the trusses are to be stored for later use in assembling a flooring or ceiling framing assembly. The truss elevator 220 is also configured, via the vertical mobility thereof, to retrieve trusses from one of the shelves 260 of the truss storage rack 250. The platform 230 is moved vertically within the truss elevator 220 by a lift system, generally designated 240, which is configured to raise and lower the platform, as well as the trusses supported thereon, between the transport level, which is defined by the plane in which the feed-in system 210 is arranged, and any of the shelves of the truss storage rack 250. In the example embodiment shown, the lift system 240 comprises a chain 244 driven about a rotatably driven sprocket 242, which comprises a plurality of gears or "teeth" that engage within complementary voids of the chain 244. In the example embodiment shown, the chain 244 is substantially rigidly attached to the platform 230 (e.g., at a corner of the platform 230). However, any suitable mechanism (e.g., a worm gear arrangement, a belt, and the like) can be provided for the lift system 240. The movement of lift system 240 may be controlled by an automated control system or manually, for example, by an operator at a human-machine interface (e.g., a controller with one or more buttons thereon, a touchscreen display, and the like). Once transferred from the platform 230 onto one of the shelves of the truss storage rack 250, the trusses can be moved along the length of the rack using rollers 214.

The truss elevator 220 is also configured to transport, via the rollers 214 rotatably attached to the platform 230, the trusses from the second base roller section 216 or any of the shelves of the truss storage rack 250 to a truss conveyor system, generally designated 300, which is shown in FIG. 4. The truss conveyor system 300 also positionally registers the trusses on/about the truss conveyor system 300. A plurality of rollers 310, which can each be either driven rollers and/or idler rollers, are provided to transport the trusses from the truss elevator 220 to be arranged over at least one of the transport tracks 320. Each of the transport tracks are coupled to a vertical actuator, generally designated 340, which can be, for example, driven pneumatically, hydraulically, by electric motors, and the like. Much like the rollers 214 of the elevator and storage system 200, the rollers 310 of the truss conveyor system 300 are oriented to transport the trusses in contact therewith in a direction that is transverse to (e.g., perpendicular to) the direction in which the trusses are transported when in contact with the transport tracks 320.

The transport tracks 320 are vertically movable between a retracted position, in which the transport tracks 320 are arranged below a contact plane of the rollers 310, which is a plane defined by the surface of each roller 310 that makes contact with the trusses, and a deployed position, in which the transport tracks 320 extend above the contact plane of the rollers 310 such that trusses will be lifted off of the rollers 310 and vertically spaced apart therefrom. As such, the transport tracks 320 prevent the transport of trusses over the rollers 310 when in the deployed position. Therefore, the trusses cannot be moved in the roller transport direction unless the transport tracks 320 are in substantially the retracted position. Thus, the trusses are transported along the rollers 310 to a registered position (e.g., against a registration stop that prevents further movement of the trusses in the roller transport direction). It should be noted that the trusses are already positionally registered in the transport direction of the transport track 320 at the second base roller section 216. Once the trusses are positionally registered in the roller transport direction to be sufficiently aligned with the assembly conveyor (810, seen e.g., FIG. 7), the transport tracks 320 are vertically raised by the vertical actuators 340 to engage with the bottom surface of the trusses and lift the trusses off of the rollers 310; this can happen when the trusses reach a designated position within the truss conveyor system 300. Position sensors 330 are provided for detecting a position of the trusses relative to a distal end of the transport tracks 320, adjacent the assembly conveyor 810, to ensure that the trusses are not inadvertently driven off of the end of the transport tracks 320. When a truss 10 is detected by one or more position sensors 330, which can be substantially coplanar to, or dimensionally offset by a predetermined distance from, a forward stop arranged at or adjacent to a distal end of one or more of the transport tracks 320, a controller stops a movement of the truss along the transport tracks 320 to prevent the truss from advancing beyond this point on the truss conveyor system 300.

The truss conveyor system 300 comprises a truss positioning robot, generally designated 350. In the embodiment shown, the truss positioning robot 350 is a 6-axis robotic arm that is attached (e.g., rigidly or movable relative to) a frame that is suspended over and about a portion of the truss conveyor system 300 adjacent to an assembly conveyor 810. It is contemplated that, in some other embodiments, a plurality of truss positioning robots 350 may be provided (e.g., on opposite sides of the transport tracks 320). In some other embodiments, the truss positioning robot 350, or the plurality thereof, may be mounted to a pedestal or other suitable support structure to position the truss positioning robot(s) 350 relative to the transport tracks 320 and the assembly conveyor 810 to be able to transfer one or more trusses from the transport tracks 320 onto the assembly conveyor 810.

The truss positioning robot 350 comprises a hub that is attached to a base, which is the portion of the truss positioning robot 350 that is physically in direct contact with the frame. The hub rotatable relative to the base along a rotary motion path defined in a plane that is substantially parallel to the plane defined by the mounting surface of the frame to which the base is attached. A first arm is attached to the hub and is rotatable relative to the hub in a plane that is substantially orthogonal to the plane defined by the rotary motion path of the hub about the base. A knuckle is attached to the first arm and is rotatable relative to the first arm in a plane that is, for example, substantially co-planar with, or parallel to, but offset from, the plane in which the first arm is rotatable about the hub. The knuckle connects a second arm to the first arm. The second arm is, in some embodiments, rotatable relative to knuckle about a longitudinal axis of the second arm. A gripper head is pivotably attached at the distal end of the second arm.

The second arm can be hollow to allow passage of control devices (e.g., pneumatic or hydraulic lines or tubes, electrical wires, actuation wires, and the like) between the knuckle and the second arm. In the embodiment shown, the gripper head comprises a clamping device having opposing and actuatable paddles that can be actuated to clamp together to rigidly secure a portion of a truss therebetween. The paddles can be coated with a friction-enhancing material, for example, a rubber or silicone material. In some embodiments, the paddles comprise a metal surface that is machined in such a way as to form a pattern configured to grip (e.g., by having a plurality of small contact points that contact, grip, and/or embed slightly within the wood to a degree sufficient to provide a gripping surface with enhanced friction) the a truss between the paddles for transport between the transport tracks 320 and the assembly conveyor 810. In embodiments having a plurality of truss positioning robots 350, the truss positioning robots 350 may be configured for redundant operation such that, if one truss positioning robot 350 malfunctions, the remaining operational truss positioning robot 350 can continue operation to transport trusses (e.g., individually or, in some instances, a plurality of trusses) from the transport tracks 320 onto the assembly conveyor 810. While clamping paddles are described herein regarding one example embodiment of the truss positioning robot 350, any suitable gripping device may be used without limitation for the gripper head of any or all such truss positioning robots 350. Similarly, while truss positioning robot 350 is shown in this example embodiment as a 6-axis robotic arm, any suitable type of automated gripping and arranging system can be utilized without deviating from the scope of the subject matter disclosed herein.

The movements of the truss positioning robot 350 are directed by software using a dynamic algorithm that allows for the truss positioning robot 350 to move trusses, either individually or en masse, from a loading position on the transport tracks to a deposit position on the assembly conveyor 810. When a truss is detected (e.g., by one or more position sensors 330) as being in a loading position on the transport tracks 320, the truss positioning robot 350 grasps the first truss positioned in the loading position on the transport tracks 320, lifts the first truss off of the transport tracks 320, transports the first truss to a position over a designated deposit position on the assembly conveyor 810, positions the first truss in contact with the assembly conveyor 810 at the designated deposit position, releases the first truss, and returns to either a "home" position or to retrieve a second truss located at the loading position on the transport tracks 320 to be transported to the designated deposit position on the assembly conveyor 810.

While the movements of the truss positioning robot 350 can be precisely monitored and controlled, in some embodiments, one or more (e.g., a plurality of) registration stops (e.g., a plate; a set of vertically, horizontally, and/or inclined tabs or bars; an adjustable two- or three-dimensional framework, etc.) are provided in a position adjacent to the designated deposit position of the assembly conveyor 810. In some such embodiments, the one or more registration stops are located vertically (e.g., directly) above the designated deposit position on the assembly conveyor 810 (e.g., at a height to allow the trusses to pass underneath when positioned on the assembly conveyor 810). In some such embodiments, the truss positioning robot 350 presses the truss(es) against the one or more registration stops to ensure precise and/or accurate registration of the truss relative to the assembly conveyor 810. As such, each truss is precisely registered relative to the assembly conveyor 810 before being placed onto the assembly conveyor 810, in the designated deposit position, before the assembly conveyor advances by the predetermined distance, which, as noted elsewhere herein, may be a variable distance to allow for different concentrations of trusses within different regions within the framing assembly, along the length of the framing assembly.

In some embodiments, the registration stops are arranged adjacent to the designated deposit position on the assembly conveyor 810 and are actuatable between a retracted position, in which the truss can be advanced along the assembly conveyor 810 from the designated deposit position, and a deployed position, in which movement of the truss along the assembly conveyor 810 from the designated deposit position is blocked by the one or more registration stops. In such an embodiment, the one or more registration stops are moved into the deployed position, the truss positioning robot 350 positions the truss against (e.g., in contact with) and/or adjacent the one or more registration stops in the designated deposit position, releases the truss in the designated deposit position, and moves to retrieve a subsequent truss from the transport tracks 320. The one or more registration stops then are moved to the retracted position and the assembly conveyor 810 advances the trusses arranged thereon by a predetermined distance, then the one or more registration stops may be moved back to the deployed position for the subsequent truss to be positionally registered thereagainst by the truss positioning robot 350. Regardless of the particular embodiment, the process of positionally registering the trusses as or before (e.g., immediately before) being positioned and released by the truss positioning robot 350 in the designated deposit position is repeated for each truss of the framing assembly, until all of the trusses specified for the framing assembly are arranged on the assembly conveyor 810 by the truss positioning robot 350.

In some embodiments, the truss positioning robot 350 is movable along the length of the assembly conveyor 810 and can position the trusses on the assembly conveyor 810 without the trusses needing to be advanced by the assembly conveyor 810 prior to a subsequent truss being positioned by the truss positioning robot 350 onto the assembly conveyor 810.

While the first truss is being transported by the truss positioning robot 350 to the assembly conveyor 810, the transport tracks 320 advance the second truss to the loading position. Similarly, while the truss positioning robot 350 is moving to retrieve, and transport, the second truss from the loading position on the transport tracks 320 to the designated deposit position on the assembly conveyor, the assembly conveyor 810 advances the first truss by a predetermined distance along the length of the assembly conveyor 810, this predetermined distance corresponding to a distance between the first and second trusses for the framing assembly being manufactured. As such, each truss that has already been positioned on the assembly conveyor 810 is also advanced by the predetermined distance when another truss is to be positioned on the assembly conveyor 810, the distance between each adjacent truss being maintained as the trusses are all uniformly and simultaneously advanced the predetermined distance by the assembly conveyor 810. This process of transporting trusses, using the truss positioning robot 350, from the transport tracks 320 to the assembly conveyor 810 is repeated until all of the trusses of the framing assembly are positioned in the designated positions (e.g., by assembly instructions provided to/by a controller) on the assembly conveyor 810. In some embodiments, the distance one or more of the trusses is advanced along the assembly conveyor 810 is different from a second predetermined distance by which the assembly conveyor 810 advances the trusses arranged thereon, such that the trusses may be spaced closer together in one or more first regions of the framing assembly than in one or more second regions of the framing assembly, thereby providing enhanced structural rigidity and/or support in the first region compared to the second region.

FIGS. 5-6 depict a second example embodiment of a system and method for positioning each truss onto an assembly conveyor by the truss placement system, generally designated 400, which is arranged adjacent the distal end of the transport tracks 320 of the truss conveyor system 300. The truss placement system comprises, adjacent each side of the assembly conveyor 810 an on opposite sides of the truss in the advanced position in which the truss is detected by the position sensors 330, a frame 402, to which a base plate 422 is movably attached to parallel tracks 406 having slots 408 formed along the length thereof. At least one (e.g., a plurality of) electrically actuated truss clamp actuators 420 is connected at the proximal end thereof to the base plate 422. A compression plate 430 is attached to the distal end of the truss clamp actuators 420. As such, a compression plate 430 is arranged on opposite lateral sides of the truss 10. The mounting plate 422 attaches clamp actuators 420 to one or more horizontal actuators, generally designated 410, that move the base plate along the length of the slots 408 formed in the tracks 406. The compression plate 430 is vertically movable, whether by vertical displacement of the frame 402, base plate 422, or any other suitable movable element, such that the truss 310 adjacent the position sensors 330 is lifted off of the transport tracks and transported through the air as it is compressed and held between the compression plates to be arranged on a positionally registered designated deposit position on the assembly conveyor 810. The assembly conveyor 810 is then advanced by a distance corresponding to a pitch between adjacent trusses 10 in the framing assembly being manufactured, a further truss 10 is advanced by the transport tracks 320 to a position at which the truss 10 is detected by the position sensors 330, the base plate 420 and/or the frame 402 and the compression plates 430 on each opposing side of the truss 10 are moved back to a retracted position, such that the further truss is arranged between the opposing compression plates 430.

The process is repeated, including lifting and transporting, whether using the truss positioning robot 350 or by applying a compressive force to the opposite sides of the truss 10 by the compression plates 430, the truss 10 to the designated deposit position on the assembly conveyor 810. This process is repeated until all of the trusses 10 specified in the assembly instructions for the framing assembly being manufactured are placed at the designated intervals (e.g., spaced apart by the predetermined distances) along the assembly conveyor 810, thereby defining the length of the framing assembly being manufactured. It is advantageous for the horizontal and vertical actuators controlling the horizontal and vertical movement of the truss 10 on the opposite sides thereof be synchronized and happen substantially simultaneous, such that the truss 10 does not become skewed due to asynchronous movement of one or more of the vertical or horizontal actuators relative to another thereof. The horizontal actuators 410 then move the truss forward and onto the truss conveyor 320. Truss conveyor 320 is advanced a specified distance to move the truss forward to create a desired pitch between adjacent trusses. This process is repeated until all of the trusses needed for a particular assembly are loaded onto the truss conveyor 320. Alternately, a robotic device can be can be utilized, either in lieu of or in addition to, the truss placement system 400 for positioning the trusses 10 on the assembly conveyor 810 at the specified positions corresponding to the pitch between trusses.

Once the adjacent trusses 10 are positioned at a predetermined spacing interval S, shown in FIG. 8, on assembly conveyor 810, each of the trusses 10 positioned on the assembly conveyor 810 is advanced by a movement of the assembly conveyor 810, which is shown in the example embodiment as being a segmented plate conveyor, but can be any suitable type of conveying device. Once all of the trusses 10 are arranged on the assembly conveyor 810 at the designated spacing interval S, the trusses 10 are ready to be attached to joists at the framing system 800. As noted elsewhere, the assembly conveyor 810 maintains the spacing S corresponding to a pitch between adjacent trusses 10. It is to be noted that the spacing between the trusses can be non-uniform within a single framing assembly. For example, the spacing may be modified in a floor section to provide for subcomponents (e.g., bathrooms) or, otherwise, to provide enhanced support and/or rigidity at positions of, for example, a flooring framing assembly where heavier items (e.g., a refrigerator, industrial equipment, etc.) are to be installed in a fixed position within the fully assembled modular construction unit.

While the trusses are being placed on the assembly conveyor 810 in the framing system 800, joists are also being prepared and delivered to the framing system 800 for assembly to the trusses to form the framing assembly. When assembled together at the framing system, the trusses and joists form a modular flooring or ceiling framing assembly. The trusses serve as cross-members providing rigidity against bending deflections along a width of the framing assembly defined along the length of the trusses. The joists provide rigidity against bending deflections along a length of the framing assembly, in a direction transverse to the direction of the length of the trusses. In other words, each framing assembly has two parallel joists and a plurality of orthogonally oriented trusses connected between the joists. The joists are fastened to the end faces of the trusses to form a substantially continuous and uninterrupted beam between a first truss of a framing assembly and a last truss of a framing assembly, relative to the length direction of the framing assembly. Additionally, while it is contemplated that it is technically possible to use a single joist along the entire length of the framing assembly, it is advantageous for each joist to be pieced together by a plurality of boards that have a length that is less than a length of the framing assembly. These boards are arranged in a staggered pattern in two layers, such that seams in a first joist layer that are formed where ends of joist boards abut each other are staggered from (e.g., not coincident with, or adjacent to) seams in a second joist layer that are formed where ends of joist boards abut each other. As such, in the example embodiment shown and described herein, each joist comprises two layers of adjacent joist boards that are connected together to form the substantially continuous and uninterrupted joist along each lateral side of the framing assembly: an inner layer arranged adjacent and connected to the lateral edges of the trusses, and an outer layer attached to the inner layer.

FIGS. 7-10 show the joist preparation and delivery devices, comprising the joist storage area, generally designated 500, the joist transporter, generally designated 600, and the joist placement system, generally designated 700. In the example embodiment, the joists comprise laminated veneer lumber (LVL), a dimensionally stable engineered wood product, however any suitably dimensionally stable lumber product may be utilized without deviating from the scope of the subject matter disclosed herein. The lumber to be used for the joists is initially stored in joist lumber storage area 500. Storage area 500 can have several designated storage locations arranged therein, which can, for example, correspond to a plurality of differently dimensioned LVL lumber, whether having different cross-sectional dimensions and/or lengths to allow for piecing together lumber of different lengths to form a joist having a specified length corresponding to the length of the framing assembly. In the example embodiment shown in FIG. 7, storage area 500 has four storage bins 510. Lumber is selected from bins 510 based on the overall length of the joist. The lumber within the bins 510 within the storage area 500 is monitored and replenished (e.g., filled) by an automated system comprising a robot and a cutting device (e.g., a saw) is provided to cut lumber to a specified length. The cutting device can be controlled by a separate controller. In the manufacture of some framing assemblies having a relatively short length, a single piece of lumber may be used to span the entire joist length and, therefore, two pieces of lumber are needed for each side of the framing assembly.

In some other embodiments, the length of the framing assembly may be longer than any of the available lengths of lumber in any of the bins 510 of the storage area 500. In such an instance, lumber is selected from one or more of the bins 510 such that joist boards having a length that is shorter than the length of the framing assembly are placed end-to-end along the length thereof to form a joist of a suitable length for the manufacture of the designated framing assembly. The ends of the boards of the inner and outer layers of the joists are arranged so as to be staggered or offset along the length direction of the framing assembly so that the joints between abutting boards of the two layers are not coincident with each other. The lumber selected to be pieced together to form the inner layer of the joist, which is to be attached directly to the trusses, is moved from storage area 500 to one of two joist placement systems 700 by a joist transporter 600. The joist transporter 600 comprises a crane 650 that can be, for example, attached to or on an overhead gantry that is laterally movable between the storage area 500 to a "near side" placement station 700A or a "far side" placement station 700B. In the example embodiment shown, the crane 650 is provided overhead so as to be able to retrieve the designated pieces of lumber from any of the specified bins 510 using any suitable method, such as, for example, a vacuum actuated lifting head that generates a lifting force by applying a suction force between a surface of the lifter head and the lumber being lifted. The crane 650 deposits the lumber onto either of two loading tables 620, which are located on opposite sides of the respective placement stations 700A, 700B. The tables 620, which can also be referred to herein as buffer tables, hold the lumber deposited thereon in the order in which the lumber was deposited thereon. In turn, the tables 620 deposit the lumber in the order in which it was deposited on the tables 620 onto the adjacent placement station 700A or 7008.

The tables 620 comprise a plurality of longitudinally extending arms 622, each of which comprises a respective one of a plurality of tracks 624, which is a chain conveyor in the embodiment shown, but can be any suitable type of conveying system or device, including, for example, a belt or segmented plate conveyor. The tracks 624 are spaced apart from each other in the length direction of the framing assembly being manufactured and are connected to each other by a shaft 632 extending between and rotatably connecting adjacent tracks 624, such that each track 624 rotates at substantially the same speed, thereby preventing the joists being transported therealong from becoming skewed due to relative speed differences between one or more of the tracks 624. Attached at an end of the tracks 624 is a plate with one or more (e.g., a plurality of) captive ball bearings 626 configured to rotate substantially omnidirectionally to transfer the joist lumber onto the joist placement system 700. The ball bearings 626 are mounted on a plate or flange that is positioned relative to the joist placement system 700 such that the joist lumber is transferred over the ball bearings from the tracks 624 onto the joist placement system 700, solely by the force of gravity pulling the joist lumber over and/or across the ball bearings. In some embodiments, the ball bearings 626 can be roller bearings or any other suitable bearing type.

The tables 620 further comprise a plurality of wheels 628, which can comprise rollers or any suitable type of rotatable device. The wheels 628 are connected to rotate substantially in unison and by a substantially identical amount by shaft 630, so that the movement of the tables 620 can be uniform relative to the stations 700A, 700B of the joist placement system 700. In some embodiments, the rotation of the wheels 628 can be monitored (e.g., by a controller) and the rotation of the wheels 628 and, accordingly, the position of the tables 620 relative to the stations 700A, 700B of the joist placement system 700, can be driven by an automated motor. The wheels 628 are configured to movably interface with tracks 610 that are arranged, e.g., under each arm 622, transverse to the length direction of the framing assembly being manufactured, such that the table 620 can move towards and/or away from the joist placement system 700 along the tracks 610. The stations 700A, 700B of the joist placement system 700 also comprise wheels that engage with one or more of the tracks 610 to change a distance W measured between the stations 700A, 700B of the joist placement system 700, the distance W corresponding to a width of the framing assembly being manufactured by system 100.

The joist lumber is sequentially transferred, via the tracks 624 and the ball bearings 626, onto rollers 720 of a respective one of the placement stations 700A, 700B. The loading of the lumber onto tables 620 can be independent of the functions of placement stations 700A, 700B, thereby allowing the crane 650 to pre-stage joist lumber onto the tables 620 based on the order in which the joist lumber is to be transferred to and assembled at the placement stations 700A, 700B of the joist placement system 700. The movement of the joist lumber over the tracks 624 can be driven by a controller or, in some embodiments where the tracks 624 are replaced with a plurality of roller bearings, by gravity and an inclination of the contact plane of the roller bearings towards an adjacent one of the stations 700A, 700B relative to the gravity vector. The lateral positions of the tables 620 and the placement stations 700A, 700B can be adjusted by moving tables 620 and placement stations 700A, 700B along track 610, which allows the joist placement system 700 to accommodate different widths of trusses for manufacturing framing assemblies of any of a plurality of widths.

To place the joists in position along the outer edges of the trusses, tables 620 deposit lumber onto an adjacent station 700A, 700B of the joist placement system 700, which then rotates the joist lumber from a substantially horizontal, or inclined, orientation to a vertical orientation against the adjacent lateral edge of each of the trusses or an inner joist band, as the case may be, for attachment thereto. This process will now be described in greater detail herein.

The placement stations 700A, 700B of the joist placement system 700 comprise a plurality of rollers 720 that are configured to drive the joist lumber in the direction J until the joist lumber makes contact with a registration stop that is arranged at or adjacent a position along the assembly conveyor 810 where a final truss 10 of the framing assembly being manufactured is positioned by the truss placement system 400. As such, when the joist lumber is in contact with the registration stop, the end of the joist lumber is aligned with a last truss 10 to be attached thereto. A load or force sensor may be provided at the registration stop to detect contact of the joist lumber against the registration stop. A plurality of pivotable assembly brackets 730, 740 are provided between rollers 720. The brackets 730, 740 are each connected to and drive by a respective actuator 735, which can be any suitable type of actuator, but is a linear actuator in the example embodiment shown. Each of the brackets 730, 740 is pivotable between a retracted position, in which the bracket 730, 740 is arranged below a transport plane of the joist lumber along the rollers 720 so as to not block movement of the joist lumber along the rollers 720 in the direction J, and a deployed position, in which the bracket 730, 740 is pivoted by the actuator 735 about a hinge adjacent the assembly conveyor 810 to a position in which the bracket 730, 740 engages against and pivots the joist lumber into the vertical position and also blocks movement of the joist lumber along the rollers 720 in the direction J.

The joist lumber for the inner layer of the joist is first deposited from table 620 onto rollers 720, which are held between two frames to form a trough. The trough is located adjacent to assembly conveyor 810, on which the spaced trusses 10 are arranged. The rollers 720 are controlled to drive the joist lumber toward a joist stop/presence detector. As necessary, multiple pieces of joist lumber are loaded into the trough and arranged end-to-end, in series, to form an inner layer of the joist corresponding to the length of the framing assembly being assembled. When the joist lumber for the inner layer of the joist is arranged satisfactorily within the trough, a plurality of inner assembly brackets 730 are simultaneously actuated by actuators 735 at each station 700A and 700B. This step rotates and/or pivots (e.g., about the hinge connecting each of the inner assembly brackets 730 to the respective placement station 700A, 700B) each piece of the joist lumber forming the inner layer of the joist of the framing assembly being manufactured from a substantially horizontal or inclined orientation within the trough to a substantially vertical orientation, in which the vertical faces of the inner joists are pressed against the lateral edge faces of the trusses 10 arranged on the assembly conveyor.

Once the inner joists are in position and pressed against the trusses, the trusses and inner joists are joined together by framing system 800. At least one automated fastener 830 (e.g., an automated nail gun) is provided on each lateral side of the trusses 10 and movable in the direction of the length of the framing assembly to apply a suitable fastener (e.g., a nail) or plurality of such fasteners through the inner layer of the joist and into each of the trusses 10, such that each truss is connected to the inner layer by at least one fastener. In some embodiments, the automated fastener 830 applies a plurality of fasteners at each truss 10 according to a first fastener pattern, thereby securing the inner layer of the joist to each of the trusses 10. In some embodiments, automated fastener 830 is an automated nail gun with a nail magazine. In some embodiments, automated fastener 830 is in electronic communication with a presence detection unit (e.g., a proximity sensor) that is configured to detect when automated fastener 830 is properly aligned with a truss 10 to which the inner layer of the joist is to be attached. In some embodiments, the position of the automated fastener 830 is monitored and/or controlled so that the automated fastener 830 advances a distance corresponding to a distance S between adjacent joists 10, such that the automated fastener 830 remains aligned with and applies the first pattern of fasteners at a position along the inner layer of the joist corresponding to a position at which a truss 10 is located. Automated fastener 830 then moves along the length of the framing assembly and applies fasteners at every joint between the trusses and the inner joists to fasten each truss 10 to the inner layer of the joist. In some embodiments, the inner assembly bracket 730 remains in the deployed position while the automated fastener 830 moves along the length of the framing assembly applying fasteners. Because the positions of the inner assembly brackets 730 are known, the fasteners are applied, as necessary, around these inner assembly brackets that are located in positions where a truss 10 is arranged at least partially under such an inner assembly bracket 730. It is advantageous for the inner and outer assembly brackets 730, 740 to have a width of less than half of a thickness of a truss, such that, due to their staggered arrangements along the length of the placement stations 700A, 700B, an adequate number of fasteners can be applied to fasten the layers of the joist to each of the trusses 10 even when the inner and outer assembly brackets 730, 740 remain in their respective deployed positions. In some embodiments, the inner assembly brackets 730 may disengaged and moved back to their retracted positions prior to automated fastener 830 moving into position in order to prevent a collision or interference between the automated fastener 830 and the inner assembly brackets 730. Once all of the fasteners have been applied, each of the inner assembly brackets 730 return to the retracted position and the automated fastener 830 returns to the "home" position.

The positioning and fastening process is then repeated to attach the outer layer of the joists to the inner layer of the joists and, depending on the length of the fasteners applied, to the trusses themselves as well. Outer joist lumber pieces are identified in the lumber storage area 500 and transported, via the crane 650 and one of the tables 620 onto the rollers 720 (e.g., in the trough) of a corresponding one of the placement stations 700A, 700B. For the outer layer of the joist, a second set of assembly brackets 740 are rotated and/or pivoted, via an actuator 735, to move from the retracted position to the deployed position, the retracted position and the deployed position of the second assembly bracket 740 being similar to the retracted position and the deployed position of the first assembly bracket 730, thereby rotating and/or pivoting the joist lumber for the outer layer of the joist into a substantially vertical position from the horizontal, or inclined, position within the trough. Because the hinge axis of the second assembly bracket 740 is coaxial to the hinge axis of the first assembly bracket 730, the clamping dimensions of the second assembly brackets 740 differ from those of the first assembly bracket 730 to account for the added width (e.g., including the width of the trusses and the width of the inner layer of the joist on both sides thereof) of the structure to which the outer layer of the joist will be attached compared to the width of the structure (e.g., comprising only the width of the trusses 10) to which the inner layer of the joist was attached. Automated fastener 830 again moves along the length of the framing assembly and applies fasteners at every joint between the trusses and the outer layer of the joist. For the outer joists, fastener 830 is configured to apply the fasteners in a second pattern, which is different from the first pattern, so that the fasteners do not interfere or contact each other. Once all of the fasteners have been applied, the second assembly brackets 740 return to the disengaged position, and automated fastener 830 returns to the "home" position. The assembly conveyor 810 then transports the framing assembly to the adhesive system 900 and to the sheathing/drywall installation system 1000.

Referring now to FIGS. 11-15, adhesive system 900 is an optional system that provides a secondary (e.g., chemically bonded) connection between a plurality of panel members (e.g., sheathing panels or drywall panels) applied over the upper surface of the framing assembly and the upper surfaces of the trusses and/or the joists of the framing assembly, thereby increasing the robustness of the attachment of the panel members to the constituent components of the framing assembly and also increasing the rigidity of the framing assembly itself. The adhesive may be omitted in some embodiments. Adhesive system 900 comprises a plurality of adhesive applicators 920 that apply an adhesive material over the top surfaces of the trusses and/or joists for securing the drywall panels (for a ceiling assembly) or the sheathing panels (for a flooring assembly) to the framing assembly. The number of adhesive applicators 920 that are activated to apply the adhesive is determined by the dimensions of the sheathing or drywall panels that will be applied at the sheathing/drywall installation system 1000. In some embodiments, for example, four adhesive applicators are activated when the drywall installation station is actively applying drywall over the trusses to form a ceiling framing assembly, while eight adhesive applicators are activated when the flooring sheathing station is actively applying sheathing over the trusses to form a flooring framing assembly.

In some embodiments, the adhesive system 900 is a glue application station utilizing two or more adhesive applicators 920 (e.g., application nozzles) and valves that are attached to a 3-axis servo-controlled gantry. As the framing assembly moves underneath this gantry and, accordingly, the adhesive applicators, the gantry tracks and applies adhesive material (e.g., glue) to all the trusses and other structural members of the framing assembly. In some embodiments, the adhesive system 900 has two degrees of freedom along the truss; accordingly, using one or more distance measuring sensors (e.g., two, or a plurality of, laser distance measurers), the adhesive system 900 can, using the adhesive applicators 920, apply the adhesive material along the length of each truss designated as having the adhesive material dispensed thereon. In some such embodiments, the adhesive material is dispensed in a substantially continuous bead (e.g., an uninterrupted line) along portions of, or the entirety of, the length of the trusses. The adhesive material may be dispensed in substantially any pattern, including, for example, a wave pattern, a "zig-zag" pattern, a plurality of physically separate dots, a step pattern, and the like. In some embodiments, using the one or more distance measuring sensors, the adhesive material can be dispensed in a position that is centered (e.g., in the direction along the length of the framing assembly) on the trusses; in some embodiments, the adhesive material may be precisely dispensed in any designated position and/or pattern on the surface of the truss along two-dimensions (e.g., in the plane defined by the upper surfaces of the trusses). As such, using the one or more distance measuring sensors, the adhesive material can be precisely deposited on the trusses in the specified pattern even if the framing assembly is imprecisely positioned on the frame transport (e.g., has slipped and/or is skewed, such that the length direction of the framing assembly is inclined relative to the transport direction of the framing assembly along the frame transport. The adhesive material can be applied within the adhesive system on a first portion of the framing assembly located therein, while panel members are applied at the same time over the inner surface of the framing assembly in the sheathing/drywall system 1000.

After the adhesive is applied, one of at least two different panel members (30, 40) will be applied over the vertically exposed, internal surface of the framing assembly. While the panel members (30, 40) are applied in a substantially similar manner, the type of panel members (30, 40) being applied to the framing assembly are different and, to allow for any variations in the physical process of engaging with, moving, manipulating, placing, etc. the different panel members (30, 40) onto the framing assembly, it is advantageous to provide duplicate structures at the sheathing/drywall system 100 for handling the different panel members (30, 40). The framing assembly is transported, via a frame transport (e.g., any suitable type of conveyor, including a segmented plate, belt, or chain conveyor), into the sheathing/drywall system 1000 and is designated (e.g., by a controller, using a set of instructions for the assembly of the framing assembly) as either a flooring framing assembly or a ceiling framing assembly. This designation determined which type of panel members (30, 40) are to be applied to the framing assembly at the drywall/sheathing system 1000.

While it is contemplated in some embodiments that sheathing panels 30 may be utilized as both a floor and ceiling cover material in a modular construction unit, for the purposes of discussing the subject matter disclosed herein, it is assumed that drywall panels 30, which can also be referred to herein as "sheetrock" and can be any other suitable wall covering material, are applied to and/or over the inner surface of a ceiling framing assembly being manufactured in the drywall/sheathing system 1000. It is further assumed, for purposes of discussing an example embodiment herein, that sheathing panels (e.g., lumber, fire-treated lumber, laminated strand lumber (LSL), laminated veneer lumber (LVL), oriented strand board (OSB), plywood, chipboard, and the like) are applied over the inner surface of a flooring framing assembly being manufactured in the drywall/sheathing system 1000. The "inner" surfaces of the flooring and ceiling framing assemblies are, respectively, the surfaces thereof that will be oriented towards the interior space of the modular construction unit when assembled together with other constituent components of the modular construction unit. Conversely, the "outer" surfaces of the flooring and ceiling framing assemblies are, respectively, the surfaces thereof that will be oriented away from the interior space (e.g., on an external surface of) of the modular construction unit when assembled together with other constituent components of the modular construction unit. After the framing assembly is transported to the a position within the drywall/sheathing system 1000, or at least where it is accessible by the drywall/sheathing system 1000, the designated type of panel members (30, 40) are applied over the surface of the framing assembly, as will be discussed further herein.

The drywall/sheathing system 1000 comprises a storage yard, generally designated 1010, in which various types and sizes of panel members (30, 40) may be stored in a position accessible by one or more overhead panel transports (1050, 1070) of the drywall/sheathing system 1000. For purposes of discussion herein, the storage yard 1010 comprises sheathing conveyors, generally designated 1010A, on which the sheathing panels 40 are loaded, deposited, and/or arranged. The storage yard 1010 further comprises drywall conveyors, generally designated 1010B, on which the drywall panels 30 are loaded, deposited, and/or arranged. The designation, size, quantity, and other characteristics of any particular conveyor as being a sheathing conveyor 40 or a drywall conveyor herein is substantially arbitrary and any conveyor may be designated as either a sheathing conveyor 1010A or a drywall panel 1010B without limitation, other than such a conveyor must be physically accessible by the requisite panel transport (1050, 1070) designated to retrieve the proper panel member (30, 40) stored on the designated conveyor.

The conveyors 1010A, 1010B comprise a plurality of rollers 1012, which may be any combination of driven rollers and/or idler rollers, including, for example, all driven rollers. The rollers 1012 contact a bottom of a panel (e.g., which may be a bottom panel in a stack of such panels) and transports the panel member (30, 40) into a designated position on the conveyor 1010A, 1010B. A registration device (e.g., a rigid plate attached to the frame of the conveyor 1010A, 1010B) may be provided to positionally register the panel member (or stack thereof) in the direction of transit of the panel member(s) (30, 40) along the rollers 1012 of the conveyors 1010A, 1010B. A position or load sensor may be provided adjacent to the registration device to stop a movement of the rollers 1012 when a panel member (30, 40) is detected being adjacent to, or in contact (e.g., forcible contact) with the registration device. This position or load sensor may be implemented on or adjacent to other registration devices of the system 100.

The drywall/sheathing system 1000 comprises at least one panel transport, which can be configured to retrieve a drywall panel 30 and/or a sheathing panel 40 from the storage yard 1010. In the embodiment shown, a drywall panel transport, generally designated 1050, and a sheathing panel transport, generally designated 1070, are provided at the drywall/sheathing system 1000. While the panel transports 1050, 1070 may comprise any suitable mechanism for lifting and transporting the respective panel members (30, 40) from the storage yard 1010, in the embodiment shown the panel transports 1050, 1070 comprise a plurality of vacuum-operated lifter assemblies 1052, 1072 that are attached (e.g., by compliant, or elastic, members, such as, for example, springs) to a mounting plate that is rigidly attached to a frame 1030 of the drywall/sheathing system 1000. In the example embodiment shown, each lifter assembly 1052, 1072 comprises a compliant material attached on a surface thereof that makes contact with a designated type of panel member (30, 40) to be able to form a sufficiently tight vacuum seal thereto to lift the designated type of panel member (30, 40) for transport to a respective registration jig (1040, 1060). This compliant material is advantageous in that, to at least varying degrees, the outer surfaces of drywall panels 30 and sheathing panels 40 have a rough (e.g., non-smooth) outer surface against which the compliant material must form a hermitic seal to generate a lifting suction force thereagainst. The compliant material can comprise any suitable material, including, for example, a suitably dense closed-cell foam, a silicone, a rubber, and the like. It is advantageous for the compliant material to have a sufficiently low durometer to form a sufficiently tight seal against the surface of the panel member (30, 40) so that the vacuum seal can be maintained without requiring a vacuum to be generated constantly. In some embodiments, the vacuum-generated suction, or lift, force may be multiples of the weight of the panel member (30, 40) being lifted to provide an adequate safety factor.

Each lifter assembly can be individually actuatable, such that less than all (e.g., two or only one) of the lifter assemblies 1052, 1072 can be actuated, as necessary, based on the dimensions of the panel member being lifted. Similarly, so that the panel members (30, 40) can be deposited onto their respective registration jigs (1040, 1060), each of the lifter assemblies (1052, 1072) can be released (e.g., the vacuum can be released) individually. In some embodiments, panel transports 1050, 1070 comprise distance and/or position sensors, which may be attached to one or more of the lifter assemblies (1052, 1072) to sense the distance between the panel transports 1050, 1070 and the panel member (30, 40) or a height (e.g., above a ground or pallet level) of the panel member (30, 40), which can be used to monitor inventory of the panel members (30, 40) within the storage yard 1010, as well as the dimensions (e.g., the width and length) of the panel members (30, 40). The panel transports 1050, 1070 can comprise a plurality of lasers used to measure distance from, and presence of, the respective panel members (30, 40), as well as, for each of the lifter assemblies (1052, 1072), vacuum meters and pressure gauges to monitor a suction, or lift, force generated at each individual lifter assembly (1052, 1072). As such, the vacuum meters and pressure gauges ensure that the panel transports 1050, 1070 can monitor and adjust the vacuum pressure, which correlates with the suction force and, accordingly, the lifting force. Together, this allows for the panel transports 1050, 1070 to select a designated type and size of panel members 30, 40 from any conveyor (1010A, 1010B) on which the designated type and size of panel member (30, 40) is located.

The distance and/or position sensors can be any suitable type of sensor, including, for example, infrared, laser, an imaging device, and the like. When triggered to retrieve a panel member (30, 40), a command is sent to a designated panel transport 1050, 1070, which then moves along the frame 1030 such that one or more lifter assemblies (1052, 1072) are arranged over a conveyor (1010A, 1010B) in which the designated type and size of panel member (30, 40) is detected by the panel transport 1050, 1070 or to a conveyor (1010A, 1010B) at which the panel transport 1050, 1070 is instructed (e.g., by a controller) to retrieve a panel member (30, 40). The distance and/or position sensors can be used to detect the presence of the panel member (30, 40) itself, the height of the lifter assemblies (1052, 1072) above the surface of the panel member (30, 40), the edges of the panel member (30, 40), and/or the width of the panel member (30, 40). The panel transports 1050, 1070 are configured to, based on the height of the panel member (30, 40) detected, proceed to consume all of the panel members (30, 40) on a first conveyor (1010A, 1010B), when a same type and size of panel member (30, 40) is located on a plurality of conveyors (1010A, 1010B), before proceeding to a second conveyor (1010A, 1010B) to begin retrieving panel members (30, 40) therefrom, thereby allowing for the first conveyor to be restocked with panel members (30, 40) while the same panel members (30, 40) are retrieved from the second conveyor. The panel transports 1050, 1070 are further configured to, based on the detection of the width of the panel members (30, 40) and the known width of the lifter assemblies (1052, 1072), align each of the lifter assemblies (1052, 1072) substantially over a middle or center of the designated and/or detected panel member (30, 40).

Once the panel transports 1050, 1070 determine that the respective lifter assemblies (1052, 1072) are aligned over a panel member (30, 40) to be lifted, the panel transports 1050, 1070 lowers the lifter assemblies (1052, 1072) such that the compliant material is in contact with the upper exposed surface of the panel member (30, 40). After contacting the panel member (30, 40), a seal is produced by inducing a vacuum through one or more holes formed in the bottom of the lifter assemblies (1052, 1072) through which air can be evacuated to form the vacuum force to lift the panel member (30, 40). When the panel transports 1050, 1070 detects that the panel member (30, 40) has become misaligned, the panel transports 1050, 1070 can, in some embodiments, be rotated relative to the frame 1030 to better align the lifter assemblies (1052, 1072) with the misaligned panel member (30, 40). A plurality of position and distance sensors can be provided to detect such a misalignment of the panel member (30, 40) relative to the lifter assemblies (1052, 1072). In some embodiments, video and/or imaging processing techniques can be used to detect such misalignment of the panel member (30, 40).

As noted elsewhere herein, after the panel members (30, 40) are lifted by the instructed panel transport 1050, 1070, the panel member (30, 40) is transported to, and deposited on, a positional registration jig (1040, 1060). In the embodiment shown, the first positional registration jig 1040 comprises a substantially planar table 1042 on which a drywall panel 30 is deposited by the drywall panel transport 1050 for positional registration thereon. Similarly, the second positional registration jig 1060 comprises a substantially planar table 1062 on which a sheathing panel 40 is deposited by the sheathing panel transport 1070 for positional registration thereon. Attached to and/or adjacent the tables 1042, 1062 are respective position and/or force, or load, sensors configured to detect the position of the panel member (30, 40) on the table (1042, 1062) and/or contact between the panel member (30, 40) and one or more of the sensors. As such, the position of the panel member (30, 40) on the table (1042, 1062) can be precisely measured and any misalignments can either be accounted for by a controller (e.g., by applying the detected misalignment to a position on the framing assembly on which the panel member (30, 40) is to be arranged) or by driving the panel member (30, 40) against the registration sensors of the positional registration jigs (1040, 1060). In some embodiments, one or more rollers may be provided in or on the surface of the table (1042, 1062) to drive the panel member (30, 40) against the registration sensors. In some other embodiments, the lifter assemblies (1052, 1072) can be temporarily engaged against the panel member (30, 40) lift and drag the panel member (30, 40) against the registration sensors, then releasing, returning to a known, or home, registered position of the panel transport 1050, 1070 (e.g., over or adjacent the table 1042, 1062). As such, the panel transports 1050, 1070 can transport a panel member (30, 40) from a known position on the table (1042, 1062) to a specified location on the framing assembly.

After being positionally registered, the panel member (30, 40) is lifted, via the lifter assemblies (1052, 1072) off of the table (1042, 1062), transported to a position in which the panel member (30, 40) is designated to be deposited onto the inner surface of the framing assembly, and the panel transport 1050, 1070 returns to retrieve further panel members (30, 40) until the entire surface, or at least the portion thereof designated, of the framing assembly is covered with the specified type and quantity of panel members (30, 40). The panel members (30, 40) are applied over the inner surface of the framing assembly adjacent each other in a predetermined panel pattern. In some embodiments, it is advantageous to advance the framing assembly along the transport frame as/after the panel members (30, 40) are placed on the framing assembly, thereby minimizing a transit time of the panel transports 1050, 1070 along the length of the framing assembly and also to minimize a size of the system 100. As noted hereinabove, a controller uses the size (e.g., width and length) of the framing assembly to determine a layout of the panel members (30, 40) on the framing assembly based on the dimensions of the panel members (30, 40) staged at the drywall/sheathing system 1000. After the designated portion (e.g., all) of the inner surface of the framing assembly is covered with the designated panel members (30, 40) the framing assembly is then transported to the fastening station 1200.

Referring now to FIGS. 16-17, fastener system 1200 comprises a plurality of fastening devices 1220 attached to a frame 1210 arranged over the transport frame along which the framing assembly moves to have suitable fasteners (e.g., screws, nails, staples, and the like) applied to fasten the panel members (30, 40) to the underlying components (e.g., the trusses and the joists) of the framing assembly. In some embodiments, the plurality of fastening devices 1220 are arranged as an array of fastening devices 1220 which can be coplanar and/or staggered, or offset, from each other by a predetermined amount based on a specified pattern.

In some embodiments, the fastener system 1200 comprises an overhead gantry with servo-controlled axis in the direction along which the framing assembly is transported along the frame transport and the direction of the trusses. Using a combination of electronic devices and sensors, the gantry will position a plurality of fastening devices over the required positions (e.g., aligned with the trusses) and apply fasteners through the panel members to secure the panel members to the framing assembly.

The fastening devices 1220 receive suitable fasteners, advantageously in a sequential manner (e.g., individually) from a centralized supply so that the fastening devices 1220 do not have to be reloaded individually, which could, in such embodiments, be accomplished manually or by an automated process. In the embodiment shown, the fastening devices 1220 are automated screw guns and the fasteners received by the fastening devices 1220 and used to attach the panel members (30, 40) to the inner surface of the framing assembly are screws of any suitable type. The screw guns comprise a screwdriver head that receives the fasteners via a supply tube connected between the centralized supply and the screwdriver head. The centralized supply can be reloaded with suitable fasteners either manually or by an automated robot that receives a plurality of fasteners and loads these fasteners into the centralized supply. The fastening devices 1220 are laterally movable in the direction indicated by the arrow labeled 1220T, which is oriented in the direction transverse to the direction along which the wall frames are transported by the frame transport. The fastening devices 1220 may be moved, relative to the frame 1210 and/or each other, along the direction 1220T in an automated manner by being driven along a track affixed to the frame 1210 or may be moved manually, for example, by an operator, to set a pitch between adjacent fasteners. The fastening devices 1220 may be spaced apart from each other to have a substantially uniform pitch, which may be determined based on applicable building codes defining a minimum allowed distance between adjacent fasteners to secure a panel member (30, 40) to a framing assembly for the modular construction unit being assembled.

The framing assembly is transported, via the frame transport, under the array of fastening devices 1220, and a plurality of fasteners are driven through the panel member (30, 40) and into the plurality of trusses and/or joists according to a predetermined fastener pattern. In some embodiments, the framing assembly remains stationary whilst the frame 1210 moves along the length of the framing assembly to apply the fasteners according to the predetermined fastener pattern. In some other embodiments, both the framing assembly and the frame 1210 are movable relative to each other, with neither being held stationary. In any case, the position of the frame 1210 relative to the framing assembly is monitored (e.g., by a controller) to ensure that the fasteners are applied to secure the panel members (30, 40) to the framing assemblies in the predetermined fastener pattern. In some embodiments, the framing assembly is transported along the frame transport with a stepped motion profile, the size of the steps corresponding substantially to the pitch between adjacent trusses, so that each truss stops under the array of fastening devices 1220.

In some embodiments, the framing assembly is located with a first region thereof in the drywall/sheathing system 1000 having panel members (30, 40) arranged thereon, while a second region of the framing assembly on which the panel members (30, 40) are already arranged, are located adjacent to and/or under the fastening system 1200, such that fasteners may be applied at the fastening system 1200 to attach panel members (30, 40) in the second region of the framing assembly that are already arranged to cover an entire width, or at least a designated portion thereof, of the framing assembly while further panel members (30, 40) are being simultaneously applied to the inner surface of the framing assembly in the first region to cover (e.g., in a sequential manner) the remainder of the portion of the inner surface of the framing assembly designated to be covered by the panel members (30, 40).

Referring now to the flowchart of FIG. 21, a fastener installation process for an using an array of fastening devices (see, e.g., 1220, FIGS. 15, 16) to secure a plurality of panel members (30, 40) to an underlying framework (e.g., framing assembly), such as is shown and described in the fastening system 1200, is shown. According to the method, the depth of the fastener (e.g., a helically threaded screw) into the panel member can be tightly and precisely controlled using a method, generally designated 2000, described hereinbelow, of attaching a plurality of wall covering panels (e.g., drywall panels and/or sheathing panels) to an internal surface of a framing assembly comprising a plurality of trusses attached between opposing joists, thereby ensuring that the fastener is precisely and accurately "seated" in panel members comprising any of a variety of materials, including, by way of example but not limitation, drywall, which can sometimes be referred to as "sheetrock," lumber, fire-treated lumber, laminated strand lumber (LSL), laminated veneer lumber (LVL), oriented strand board (OSB), plywood, chipboard, and the like. Although the description of the method herein makes reference to a single fastening device 1220, it is to be understood that the method is applicable to a plurality and/or array of fastening devices acting in unison and/or in cooperation with one another.

In an initial step 2001, a drive controller, which can be a controller of the entire system 100, (see, e.g., FIG. 1) of a station, sub-component, and the like of the system 100, or even a dedicated controller for each of the fastening devices 1220, queries a fastening device 1220 to determine if the fastening device 1220 is initialized, ready to begin motion. This step can include, for example, determining that the fastening device 1220 is powered on and that the rotational portion thereof (e.g., the rotatable chuck connecting the screwdriver head to the fastening device 1220) is engaged. If the fastening device 1220 is not ready for motion, the fastening device 1220 is reset. If the fastening device 1220 is ready for motion, the method continues to step 2002, where another query is made to confirm that a fastener is present adjacent to the screwdriver head in a position to be engaged by the screwdriver head. If a fastener is present in the fastening device 1220, the screwdriver head is then lowered at step 2003. The drive controller again confirms that the lowering step has been completed at step 2004. If the screwdriver head has not been lowered, the drive controller re-sends the lowering signal to the screwdriver head. Step 2003 can be repeated until a predetermined number of attempts to lower the screwdriver head has been reached, in which case a warning or error message can be generated for diagnosis and/or remedial action, as needed, or until the screwdriver head is lowered. When the screwdriver head is successfully lowered, the fastening device 1220 begins to rotate the fastener at step 2005.

In addition to a drive controller, the automated fastening device 1220 includes a torque controller and a depth controller, both of which can communicate with the drive controller. The torque controller controls and measures the torque generated by the resistance of the fastener as it penetrates the wall material and any structure arranged thereunder, as well as performing additional functions such as limit-setting, time-based calculations, etc. The depth controller controls advancement of the screwdriver head. In particular, the screwdriver head is lowered to a predetermined distance, known as a "depth zone," which is based on aspects, such as screw length and material thickness of the wall material and any underlying structures.

As the screwdriver head advances in the downward direction, as the fastener is progressively rotated and driven into the wall material and underlying wall materials, the torque controller records the torque produced by the action of threadably engaging (e.g., screwing) the fastener into the wall material and underlying structures at step 2006. At substantially the same time (e.g., substantially simultaneously), the depth controller monitors the screw depth and communicates when the screwdriver head reaches the "depth zone" at step 2007. When the fastener reaches the "depth zone," the torque controller compares an averaged measured torque value (e.g., measured over a predetermined time window) against a standard minimum torque value threshold for the threadable insertion of the fasteners into the wall material and/or the associated structures arranged thereunder at step 2008. The minimum torque value threshold is assigned based on strength parameters for a particular combination of fastener and the materials comprising the wall material and any associated structures arranged thereunder to which the wall material is to be attached by the fastener. If the averaged measured torque value does not meet the minimum torque value threshold, a fault is generated by/at the drive controller. If the averaged measured torque value meets the minimum torque value threshold, then a range of acceptable final torque values, referred to herein as a "torque window," is created. The "torque window" can be determined based on the average torque value measured at the time the screw reaches the "depth zone" at step 2009.

Next, the automated fastening device 1220 determines how much additional torque to apply to the fastener to achieve a target fastener depth beneath the outermost surface of the wall material. In step 2010, the torque controller continues measuring the torque at the fastening device 1220 and compares the torque value measured to the acceptable range within the "torque window." The screwdriver head will continue to rotate the fastener until one of several scenarios occurs. For example, in a first aspect of the method, the measured torque value remains within the "torque window." In this first aspect, the fastener application method is limited by a maximum time threshold at step 2011A. This can be accomplished, for example, by measuring the amount of time that the fastener has been in the "depth zone" and comparing this amount of time to a predetermined maximum time value.

Alternately, in a second aspect of the method, the measured torque value could be above or below the "torque window." In this second aspect, a slip monitor is used for determining whether an adequately robust mechanical connection exists between the fastener and the screwdriver head as another check on the quality of the fastener connection to the screwdriver head at step 2011B. If the slip monitor exceeds an expected value (e.g., in the case of stripping), a fault can be generated by/at the drive controller. Otherwise, according to a third aspect of the method, the screwdriver head will continue to turn until either a maximum number of revolutions are reached at step 2011C or until a predetermined time limit is met or exceeded. In each of the three aspects noted and described herein, the method 2000 concludes with stopping the screwdriver head at step 2012 and raising the screwdriver head at step 2013.

In some embodiments, a gantry on which the frame 1210 is located is movable over some distance in the direction of the length of the framing assembly, so that the framing assembly can remain in motion along the frame transport as the fasteners are driven through the panel members (30, 40) and into the framing assembly. The fastened assembly is then transported to the routing system 1300, or, in systems in which the routing system 1300 is omitted or not required for the manufacture of the designated framing assembly, to an etching system 1400, or, in systems in which the routing system 1300 and the etching system 1400 are both omitted or not required for the manufacture of the designated framing assembly, to the butterfly flip table 1500.

Routing system 1300 comprises a precision routing robot 1310 (see, e.g., FIG. 11). Robot 1310 is mounted on a frame 1320 arranged, for example, vertically above the transport path of the framing assembly along the frame transport, in a position where the inner surface of the framing assembly is accessible to the routing robot 1310, and is equipped with a routing head 1350. Routing head 1350 can include any suitable cutting device, including one or more hole saws, saw blades, rotary routing devices (e.g., in the form of a plunge router), etc., and can be positioned relative to the inner surface of the framing assembly to perform any specified routing operations. This can include providing access points (e.g., through-holes in or on which covers may subsequently be installed) for utilities (e.g., electrical wiring plumbing, telecommunications, HVAC devices and/or ductwork, etc.), such as cutting holes for plumbing or electrical applications or, in the case of ceiling framing assemblies, cutting holes in the drywall for sprinkler heads, electrical boxes for lighting fixtures, and the like. As noted hereinabove regarding the frame transports at each system of system 100, the frame transport of the routing system 1300 comprises a laterally extendable conveyor, which can be, for example, a segmented plate, belt, or chain type conveyor system and is configured to move the framing assembly in a direction orthogonal to the main direction of travel. This allows a wider range of motion for routing robot 1310 and also accommodates framing assemblies of different widths, as measured in the direction transverse (e.g., perpendicular) to the direction along which the framing assembly is transported by the frame transport. Due to positional tracking of the framing assembly on the frame transport at the routing system 1300, the routing robot 1310 may be configured to move the routing head 1350 along with (e.g., at the same speed as) the framing assembly to perform the routing operations on the framing assembly while the framing assembly remains in motion (e.g., without stopping) along the frame transport throughout the routing system 1300. As such, the framing assembly may be transported throughout the entire length of the routing system 1300 without stopping.

After any specified routing operations, if any, are complete, the framing assembly is then transported to the etching station 1400, shown in FIG. 18, which may be provided on the same frame as the routing robot 1310 and may use a common frame transport. As such, the routing operations may be performed on the framing assembly substantially simultaneously (e.g., at the same time) to the etching operations being performed on a different portion of the framing assembly. The etching device 1430 can be a laser or any other device suitable for creating an etched pattern or image into the surface of the panel members (30, 40) of the framing assembly. The etching device 1430 is configured to mark, for example, keep-outs and mounting locations for fixtures on the inner surface of the flooring framing assembly. The etching device 1430 is attached to a frame 1420, which can move in the direction indicated by arrow 1420T along the transport frame. The etching device 1430 is movable relative to the frame 1420 in the direction indicated by arrow 1430T. As such, the etching device 1430 can perform etching operations on substantially all of the inner surface of the framing assembly. In some embodiments, the etching system 1400 comprises a plurality of etching devices 1430. Due to positional tracking of the framing assembly on the frame transport at the etching system 1400, the etching device 1430 may be configured to move along with (e.g., at the same speed as) the framing assembly to perform the etching operations on the framing assembly while the framing assembly remains in motion (e.g., without stopping) along the frame transport throughout the etching system 1400. As such, the framing assembly may be transported throughout the entire length of the etching system 1400 without stopping.

Referring now to FIG. 19, the framing assembly is then transported onto a butterfly flip table 1500. In this step, the framing assembly is flipped 180° so that the inner surface of the framing assembly rotated by substantially 180° to be oriented in the down direction, substantially opposite the direction in which the inner surface is oriented when transported by a frame transport in, for example, the drywall/sheathing system 1000. The butterfly flip table 1500 includes first frame 1510 on which the framing assembly is initially transported from the etching station 1400, the routing station 1300, and/or the fastening station 1200, and a second frame 1520 which is movably attached (e.g., by wheels) over tracks 1502 so that, after the framing assembly is flipped onto the second frame 1520, the second frame may be moved to substantially align with frame transports of the insulation system 1700 or the sheathing/membrane installation system 1800.

Both the first frame 1510 and the second frame 1520 are configured to pivot in opposite directions between the substantially horizontal position shown in FIG. 19, in which the transport surfaces are substantially coplanar with each other, and a substantially vertical transfer position, in which the transport surfaces are oriented to face each other. The first and second frames 1510, 1520 comprise a plurality of rollers 1504, which can be any combination of driven rollers and idler rollers, including, for example, all driven rollers. The rollers 1504 define a contact plane between the first and second frames 1510, 1520 and the framing assembly supported thereon. The first and second frames 1510, 1520 comprise a plurality of arms 1506 on adjacent edges thereof to support the framing assembly when the first and second frames 1510, 1520 move into the transfer position. According to an example embodiment, the first and second frames 1510, 1520 pivot from the horizontal position into the transfer position.

To prevent the arms 1506 of the second frame 1520 from contacting the framing assembly on the first frame 1510 while the second frame 1520 pivots into the transfer position, the second frame 1520 may be pivoted prior to the first frame 1510, may be spaced apart in the direction 1520T from the first frame 1510 a distance sufficient that the arms 1506 will not contact the framing assembly or the first frame 1510. In some embodiments, it may be necessary to space the second frame 1520 apart from the first frame 1510 in the direction 1520T and also to pivot the second frame 1520 by a prescribed amount before beginning to pivot the first frame. When transferring a framing assembly from the first frame 1510 to the second frame 1520, it can be particularly advantageous for the second frame to be pivoted fully into the transfer position before the first frame 1510 is pivoted fully into the transfer position to prevent the framing assembly from inadvertently tipping from the first frame 1510 onto the second frame 1520 prior to the second frame 1520 being pivoted fully into the transfer position. Once the second frame 1520 is pivoted into the transfer position, it is advantageous to move the second frame to a position adjacent the first frame 1510 so that the arms 1506 of the second frame 1520 will be in position to engage with and support the framing assembly.

In any case, once the first and second frames 1510, 1520 are in the transfer position, the first and/or second frames 1510, 1520 move, relative to each other along tracks 1502, so that the arms 1506 of the first and second frames 1510, 1520 are both fully engaged about the framing assembly and/or the framing assembly is in contact on both sides with the rollers 1504 of both the first and second frames 1510, 1520. After the second frame 1520 is fully engaged with the framing assembly, the second frame 1520 is pivoted from the transfer position to the horizontal position, the arms 1506 of the second frame 1520 supporting and rotating the framing assembly away from the first frame 1510 as the second frame 1520 pivots to the horizontal position. The first frame 1510 is then pivoted back to the horizontal position and positioned along the tracks 1502 to be substantially aligned with the frame transport from the etching station 1400, the routing station 1300, and/or the fastening station 1200 in a positionally registered "home" position. The second frame 1520 then transports the framing assembly along the tracks 1502 to be aligned with either the insulation system 1700 or the sheathing/membrane installation system 1800, depending on whether the framing assembly being transported is designated as a flooring framing assembly or a ceiling framing assembly, respectively. Once aligned, the second frame 1520 engages the rollers 1504 and transports the framing assembly onto a frame transport of either the insulation system 1700 or the sheathing/membrane installation system 1800 and the process repeats for a subsequent framing assembly.

In some embodiments, lateral stops 1522 are provided at the ends of the tracks 1502 to prevent the first and second frames 1510, 1520 from moving beyond the respective ends of the tracks 1502. These lateral stops can act as positional registration devices against which the first and second frames 1510, 1520 can be driven to recalibrate the position thereof in case, for example, a misalignment is detected for either of the first and second frames 1510, 1520. The operation of the first and second frames 1510, 1520 as described herein can be reversed in some embodiments, such that a framing assembly can be transferred from the second frame 1520 to the first frame 1510.

Depending on whether a flooring or a ceiling framing assembly is being produced, the framing assembly is then transported to the insulation system 1700 or the sheathing/membrane installation system 1800. At the insulation system 1700, illustrated in FIG. 20, insulation is installed therein. In the example embodiment shown, the insulation comprises a blown insulation material, which can be a cellulose insulation material comprising a specified moisture content to allow it to be packed to a specified density. The insulation material is blown into the cavities of the framing assembly by a supply tube 1720, which moves (e.g., in an oscillating manner) along a track 1712, which is in turn connected to a cross-member of a frame 1710. The insulation material is blown into the cavities while the framing assembly is transported under the frame 1710 along a frame transport. While the insulation is applied within the framing assembly, a separate gantry with multiple degrees of freedom may be provided to apply a suitable covering (e.g., cardboard) and staple the covering in place in order to contain the insulation within the framing assembly.

FIG. 22 shows an example embodiment of an insulation loading station, generally designated 2100. Insulation material 80 is supplied to the insulation system 1700 by the insulation loading station 1100, which is an automated station wherein an insulation material is provided, unpacked, loaded into a hopper (e.g., 2140), and transferred to the insulation system 1700. The insulation material 80 can be any suitable material, including, for example, a blown cellulose material having a predetermined moisture content to achieve a desired insulation density within each cavity of the framing assembly between adjacent trusses at the insulation system 1700. At the insulation loading station 2100, insulation material 80 is loaded, e.g., by an insulation loading robot 2110 positioned on a pedestal 2112, onto a conveyor 2102. The insulation loading robot 2110 can be any suitable type of robot, however, in the embodiment shown, is a 6-axis automated robotic arm, configured to lift, manipulate, and load the insulation material 80 into a hopper 2140. An end effector is attached at the distal end of the insulation loading robot 2110, such that insulation material 80, which can be a packaged insulation material 80, can be picked up from an insulation supply area and loaded onto the conveyor 2102 by the insulation loading robot 2110.

The insulation material 80 is transported along the conveyor 2102 to a primary insulation loading station, generally designated 2130, comprising a second insulation unloading robot, generally designated 2134, which unpackages the insulation material, as needed, using an end effector, generally designated 2136, removing any external packaging therefrom, and places the insulation material 80 into one or more insulation hoppers 2140, which can add a specified amount of moisture, on a measured moisture content of the insulation material 80 within the hopper 1140, so that the insulation material 80 supplied to the insulation system 1700 can be packed at a specified density and, therefore, the assembled wall module can achieve a specified insulation value. Once the proper moisture content is achieved, the hoppers 2140 supply the insulation material 80 to the insulation system 1700 by blowing the insulation material

80 through one or more supply tubes 2180 connected between the hoppers 2140 and the insulation system 1700.

A second insulation robot, generally designated 2164, can be provided at a secondary insulation loading station, generally designated 2160, further along the conveyor 2102 and can load insulation material 80 into hoppers 2140 located adjacent to the second insulation robot 2164. The end effector 2166 can be the same or different from the end effector 2136 of the first insulation robot 2134, so long as the end effector 2166 is capable of picking up insulation material 80 from the conveyor, removing any packaging material therefrom, and placing (e.g., by dropping) the insulation material 80 into the hoppers 2140.

The type and density of the insulation can vary according to the application. For example, in some embodiments, the flooring insulation is not as densely packed, and it has lower moisture content. After the insulation is installed, the framing assembly returns to butterfly flip table 1500. As it moves onto butterfly table 1500, a mesh netting is attached to the trusses and/or the joists (e.g., by stapling) to hold the insulation material within the cavities of the flooring framing assembly. The butterfly flip table 1500 then flips the flooring framing assembly 180° so that the finished (e.g., sheathed) side is facing up. A crane moves the completed flooring framing assembly to a floor module storage area 1950 for later assembly to wall modules in forming a modular construction unit.

If the framing assembly is a ceiling unit, the butterfly flip table 1500 transports the assembly to the sheathing/membrane installation system 1800. Here, the ceiling framing assembly enters the ceiling finishing area with the drywall panels facing down. Sprinklers, plumbing, light fixtures, electrical wiring, telecommunications, and insulation are installed therein. Sheathing and an EPDM layer are applied to enclose the ceiling framing assembly, and then the ceiling framing assembly is transported back to the butterfly flip table 1500. A crane moves the completed ceiling framing area to a ceiling module storage area 1900 for later assembly to wall modules in forming a modular construction unit.

While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The methods and systems disclosed herein can be combined in any combination and/or sub-combination, adding elements from other systems and/or sub-systems or steps from other methods and/or sub-methods, as the case may be, and/or omitting elements from other systems and/or subsystems or steps from other methods and/or sub-methods without limitation. Nothing disclosed herein shall be interpreted as limiting in any way the combinations in which the features, structures, steps, etc. may be organized, described, and/or claimed in this or any related applications.

What is claimed is:

1. A system for assembling a framing assembly for a floor or ceiling in a modular construction unit, the system comprising:

a truss placement system configured to receive trusses, via a truss conveyor system, from a truss storage area, wherein the truss placement system is configured to position trusses on an assembly conveyor, the trusses being spaced apart from each other by a predetermined distance;

a joist placement system configured to receive and arrange dimensional lumber adjacent lateral edges of the trusses on opposite sides of the assembly conveyor;

a framing system comprising the assembly conveyor and a plurality of first fastening devices configured to move along a length of the assembly conveyor to attach the joists to the trusses via applying a plurality of fasteners in at least one predetermined fastener pattern through a joist and one of the trusses;

a sheathing/drywall installation system configured to position a plurality of panel members over an exposed surface of the framing assembly after the trusses and the joists are fastened together at the framing system, the panel members being positioned to cover all or a designated portion of the exposed surface of the framing assembly according to a panel placement pattern associated with the framing assembly being assembled; and a fastening system comprising a plurality of second fastening devices to attach, by applying a plurality of fasteners through at least one of the panel members and one of the trusses or the joists of the framing assembly, the panel members to the framing assembly.

2. The system of claim 1, wherein:

the dimensional lumber forming the joists comprises laminated veneer lumber;

the trusses comprise a rigid framework formed from a plurality of individual elements; and the joist placement system comprises a plurality of tables arranged on opposite lateral sides of the assembly conveyor, the plurality of tables being configured to transport the dimensional lumber deposited thereon to a position adjacent the assembly conveyor.

3. The system of claim 2, comprising:

a trough, which is adjacent to the assembly conveyor and is formed by a plurality of rollers configured to transport the dimensional lumber received from the tables of the joist placement system against a registration stop configured to substantially align an end of the joists with a last of the trusses placed on the assembly conveyor; and a plurality of brackets that are arranged along and in between the rollers of the trough, the brackets being pivotable between a retracted position, in which the joists within the trough are in contact with the rollers, and a deployed position, in which the joists are pivoted to a substantially vertical position adjacent lateral edges of the trusses;

wherein the plurality of first fastener devices is configured to move along the length of the assembly conveyor to apply the plurality of fasteners in the at least one predetermined fastener pattern to attach the joists and the trusses together after the joists have been moved into the substantially vertical position by the plurality of brackets.

4. The system of claim 3, wherein:

the joists comprise at least an inner layer of dimensional lumber and an outer layer of dimensional lumber;

the plurality of brackets comprise a plurality of first brackets and a plurality of second brackets;

the plurality of first brackets are configured to arrange the inner layer of the dimensional lumber against the lateral edges of the trusses; and the plurality of second brackets are configured to arrange the outer layer of dimensional lumber against the inner layer of dimensional lumber.

5. The system of claim 4, wherein:

the plurality of first fastener devices is configured to move along the length of the assembly conveyor to apply the plurality of fasteners in a first predetermined fastener pattern to attach the inner layer and the trusses together after the inner layer has been moved into the substantially vertical position against the lateral edges of the trusses by the plurality of first brackets;

the plurality of first fastener devices is configured to move along the length of the assembly conveyor to apply the plurality of fasteners in a second predetermined fastener pattern to attach the outer layer and the inner layer together after the outer layer has been moved into the substantially vertical position against the inner layer by the plurality of second brackets;

the first predetermined fastener pattern is different from, and does not overlap with, the second predetermined fastener pattern along the length of the assembly conveyor; the plurality of first brackets and the plurality of second brackets are each connected to one of a plurality of independently controlled actuators that move the plurality of first brackets and the plurality of second brackets between respective retracted and deployed positions;

the inner layer and the outer layer are each pieced together from a plurality of pieces of dimensional lumber, each of which have a length that is less than a length of the joists; and joints, which are defined as being where ends of dimensional pieces of lumber in a same layer of dimensional lumber, are positionally staggered and/or offset along the length of the assembly conveyor so that no joints in the inner layer are coincident with any joints in the outer layer.

6. The system of claim 1, comprising a routing system having a routing robot configured to form openings in one or more of the panel members.

7. The system of claim 1, wherein the assembly conveyor is laterally expandable in a direction orthogonal to a direction in which the trusses are advanced along the assembly conveyor to accommodate framing assemblies of any of a plurality of widths.

8. The system of claim 1, comprising an etching system configured to mark keep-outs and/or mounting locations of fixtures on the panel members attached to the framing assembly.

9. The system of claim 1, comprising a butterfly flip table configured to rotate the framing assembly such that the panel members attached thereto are rotated by substantially 180° and to transport the framing assembly to an insulation system or a sheathing/membrane installation system, respectively.

10. The system of claim 1, comprising an adhesive application system, which comprises a plurality of applicator nozzles configured to dispense an adhesive material onto an upper surface of the trusses and/or the joists of the framing assembly.

11. A method of assembling a framing assembly for a floor or ceiling in a modular construction unit, the method comprising:

positioning, using a truss placement system, trusses on an assembly conveyor such that the trusses are spaced apart from each other by a predetermined distance;

receiving and arranging, via a joist placement system, dimensional lumber forming joists adjacent to lateral edges of the trusses on opposite sides of the assembly conveyor;

moving, at a framing system, a plurality of first fastening devices along a length of the assembly conveyor and applying a plurality of fasteners in at least one predetermined fastener pattern through the joists and one of the trusses to attach the joists to the trusses;

positioning, at a sheathing/drywall installation system, a plurality of panel members over an exposed surface of the framing assembly after the trusses and the joists are fastened together at the framing system, the panel members being positioned to cover all or a designated portion of the exposed surface of the framing assembly according to a panel placement pattern associated with the framing assembly being assembled; and applying, at a fastening system, a plurality of fasteners through at least one of the panel members and one of the trusses or the joists of the framing assembly, using a plurality of second fastening devices, to attach the panel members to the framing assembly.

12. The method of claim 11, wherein:

the dimensional lumber forming the joists comprises laminated veneer lumber;

the trusses comprise a rigid framework formed from a plurality of individual elements; and the joist placement system comprises a plurality of tables that transport the dimensional lumber deposited thereon to a position adjacent the assembly conveyor, the tables being arranged on opposite lateral sides of the assembly conveyor.

13. The method of claim 12, comprising:

transporting the dimensional lumber received from the tables of the joist placement system along a trough formed by a plurality of rollers, the trough being adjacent to the assembly conveyor, against a registration stop to substantially align an end of the joists with a last of the trusses placed on the assembly conveyor;

arranging a plurality of brackets along and in between the rollers of the trough, the brackets being pivotable between a retracted position, in which the joists within the trough are in contact with the rollers, and a deployed position, in which the joists are pivoted to a substantially vertical position adjacent lateral edges of the trusses; and moving the plurality of first fastener devices along the length of the assembly conveyor and applying in the at least one predetermined fastener pattern the plurality of fasteners to attach the joists and the trusses together after the joists have been moved into the substantially vertical position by the plurality of brackets.

14. The method of claim 13, wherein:

the joists comprise at least an inner layer of dimensional lumber and an outer layer of dimensional lumber;

the plurality of brackets comprise a plurality of first brackets and a plurality of second brackets; the plurality of first brackets arrange the inner layer of the dimensional lumber against the lateral edges of the trusses; and the plurality of second brackets arrange the outer layer of dimensional lumber against the inner layer of dimensional lumber.

15. The method of claim 14, comprising:

moving the plurality of first fastener devices along the length of the assembly conveyor and applying the plurality of fasteners in a first predetermined fastener pattern to attach the inner layer and the trusses together after the inner layer has been moved into the substantially vertical position against the lateral edges of the trusses by the plurality of first brackets; and moving the plurality of first fastener devices along the length of the assembly conveyor and applying the plurality of fasteners in a second predetermined fastener pattern to attach the outer layer and the inner layer together after the outer layer has been moved into the substantially vertical position against the inner layer by the plurality of second brackets;

wherein the first predetermined fastener pattern is different from, and does not overlap with, the second predetermined fastener pattern along the length of the assembly conveyor;

wherein the plurality of first brackets and the plurality of second brackets are each connected to one of a plurality of independently controlled actuators that move the plurality of first brackets and the plurality of second brackets between respective retracted and deployed positions;

the inner layer and the outer layer are each pieced together from a plurality of pieces of dimensional lumber, each of which have a length that is less than a length of the joists; and joints, which are defined as being where ends of dimensional pieces of lumber in a same layer of dimensional lumber, are positionally staggered and/or offset along the length of the assembly conveyor so that no joints in the inner layer are coincident with any joints in the outer layer.

16. The method of claim 11, comprising forming, at a routing system having a routing robot, openings in one or more of the panel members.

17. The method of claim 11, wherein the assembly conveyor is laterally expandable in a direction orthogonal to a direction in which the trusses are advanced along the assembly conveyor to accommodate framing assemblies of any of a plurality of widths.

18. The method of claim 11, comprising marking, at an etching system, keep-outs and/or mounting locations of fixtures on the panel members attached to the framing assembly.

19. The method of claim 11, comprising rotating, using a butterfly flip table, the framing assembly such that the panel members attached thereto are rotated by substantially 180° and to transport the framing assembly to an insulation system or a sheathing/membrane installation system, respectively.

20. The method of claim 11, comprising dispensing, at an adhesive application system having a plurality of applicator nozzles, an adhesive material onto an upper surface of the trusses and/or the joists of the framing assembly.

* * * * *